US009286058B2

(12) United States Patent
Mahajan et al.

(10) Patent No.: US 9,286,058 B2
(45) Date of Patent: *Mar. 15, 2016

(54) APPARATUSES, METHODS AND SYSTEMS FOR APPLICATION PROGRAMMING INTERFACE CALL ABSTRACTION

(71) Applicant: Zynga Inc., San Francisco, CA (US)

(72) Inventors: Amitt Mahajan, San Francisco, CA (US); Luke Rajlich, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/337,172

(22) Filed: Jul. 21, 2014

(65) Prior Publication Data
US 2014/0331214 A1 Nov. 6, 2014

Related U.S. Application Data

(63) Continuation of application No. 12/885,133, filed on Sep. 17, 2010, now Pat. No. 8,832,676.

(60) Provisional application No. 61/277,978, filed on Sep. 30, 2009, provisional application No. 61/277,950, filed on Sep. 30, 2009.

(51) Int. Cl.
G06F 9/44 (2006.01)
G06F 9/445 (2006.01)
G06F 9/45 (2006.01)

(52) U.S. Cl.
CPC .. *G06F 8/65* (2013.01); *G06F 8/41* (2013.01); *G06F 8/43* (2013.01); *G06F 8/71* (2013.01)

(58) Field of Classification Search
CPC ........................................................ G06F 8/65
See application file for complete search history.

(56) References Cited

U.S. PATENT DOCUMENTS

| 5,339,430 | A  | * | 8/1994 | Lundin et al. ................. 719/332 |
| 7,000,185 | B1 | * | 2/2006 | Murren et al. ................. 715/203 |
| 7,653,528 | B2 | * | 1/2010 | Kohlmeier et al. ............... 704/8 |
| 7,680,646 | B2 | * | 3/2010 | Lux-Pogodalla et al. ........ 704/2 |
| 2003/0126559 | A1 | * | 7/2003 | Fuhrmann ..................... 715/513 |
| 2003/0182632 | A1 | * | 9/2003 | Murdock et al. .............. 715/536 |
| 2005/0043938 | A1 | * | 2/2005 | Viken et al. ....................... 704/8 |
| 2008/0104580 | A1 | * | 5/2008 | Wilkinson .................... 717/141 |

* cited by examiner

*Primary Examiner* — James D Rutten
(74) *Attorney, Agent, or Firm* — Martine Penilla Group, LLP

(57) ABSTRACT

The apparatuses, methods and systems for API call abstraction includes obtaining programming code for an application. The obtained programming code is parsed to identify various instructions contained therein. An application programming interface (API) call is identified in the programming code, based on the parsing. The API call includes an input string. It is then determined whether the API call requires a pre-registered bundle to replace the input string. A database is queried for the pre-registered bundle using the input string. The pre-registered bundle is retrieved and is incorporated into the application by replacing the input string.

20 Claims, 17 Drawing Sheets

EXEMPLARY BUNDLE REGISTRATION REQUEST COMPONENT 400B

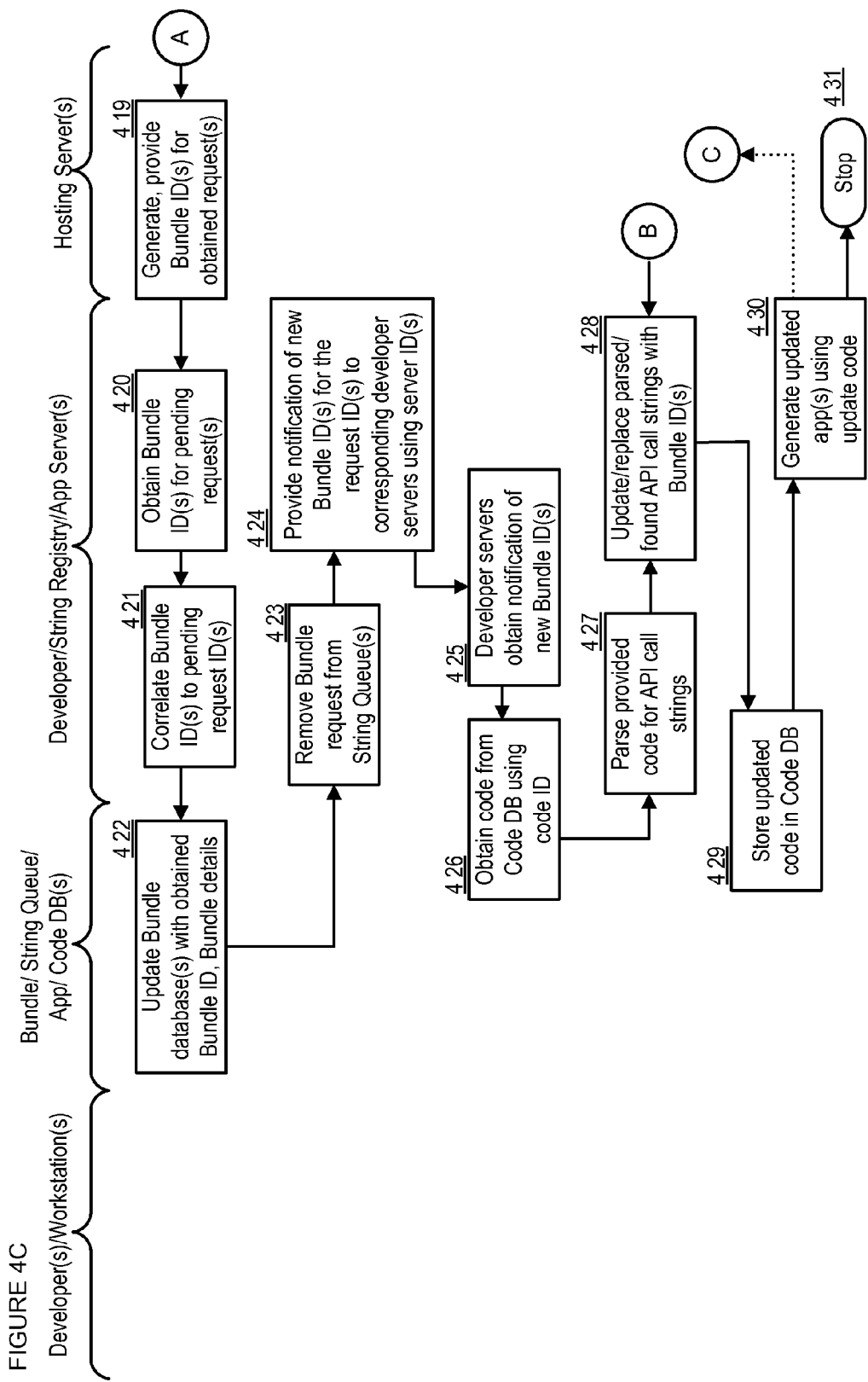

Bundle Request Selected for Dequeuing: Queue Position 4

EXEMPLARY BUNDLE REQUEST MANAGEMENT COMPONENT 500

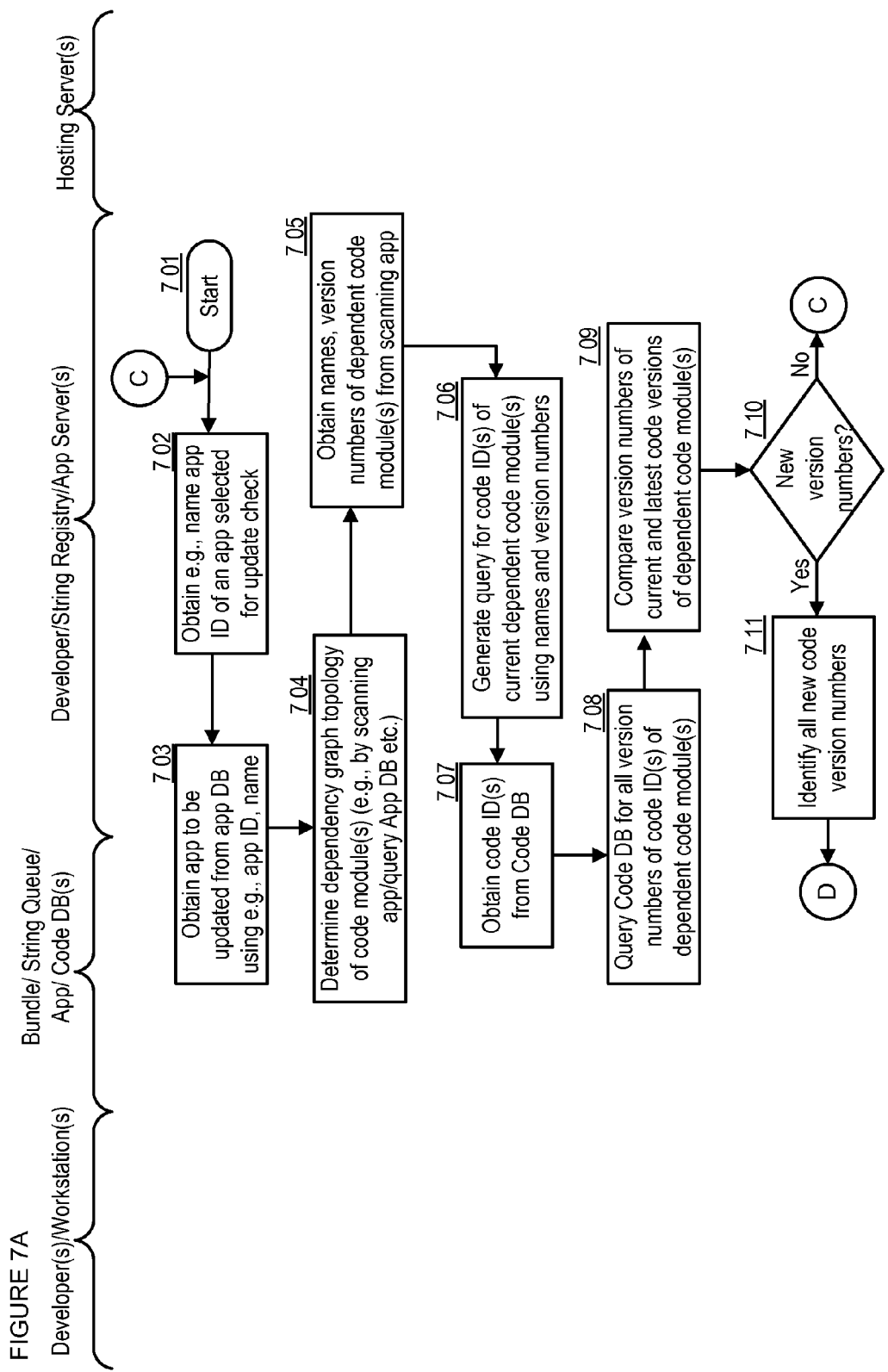

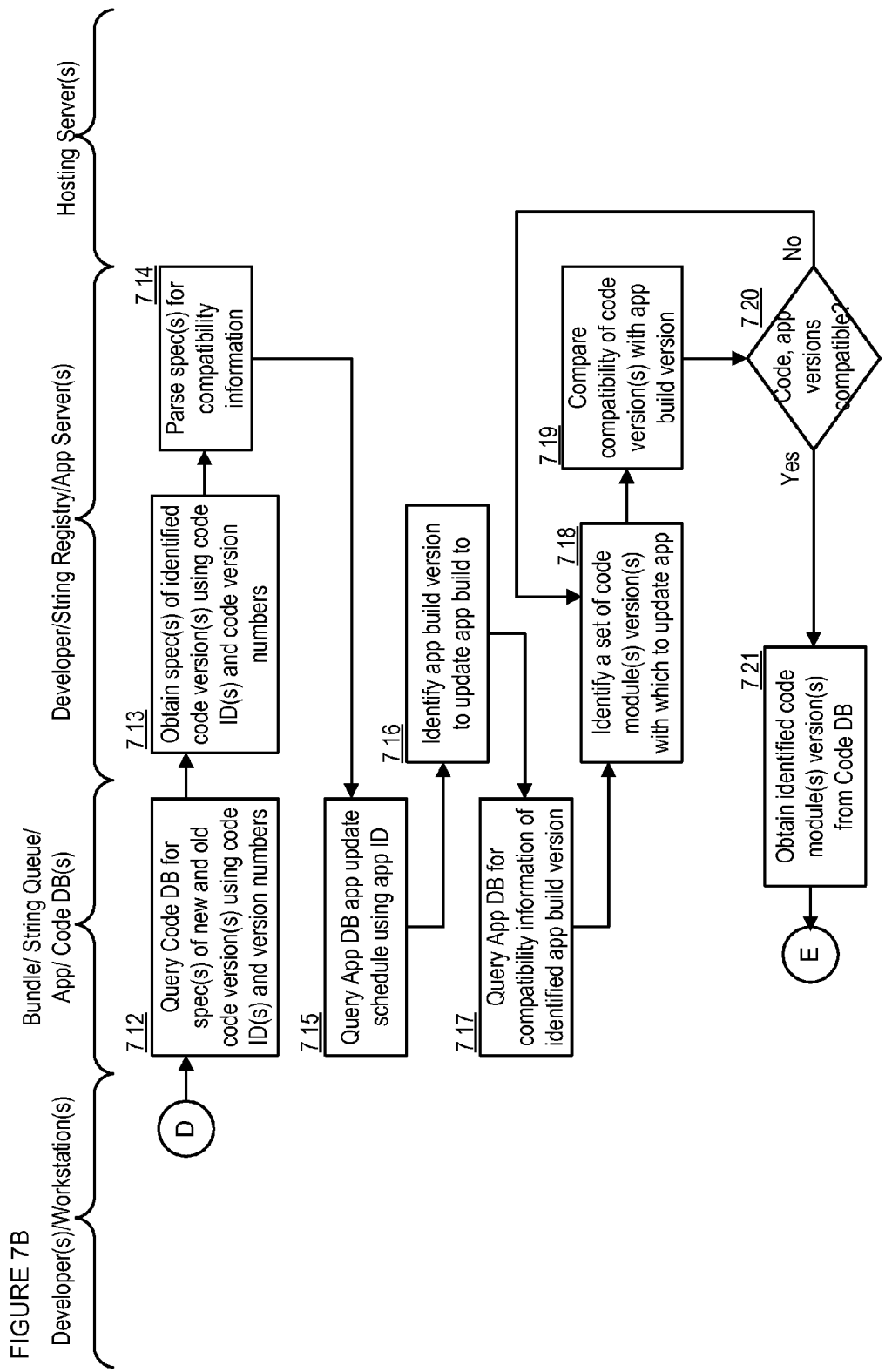

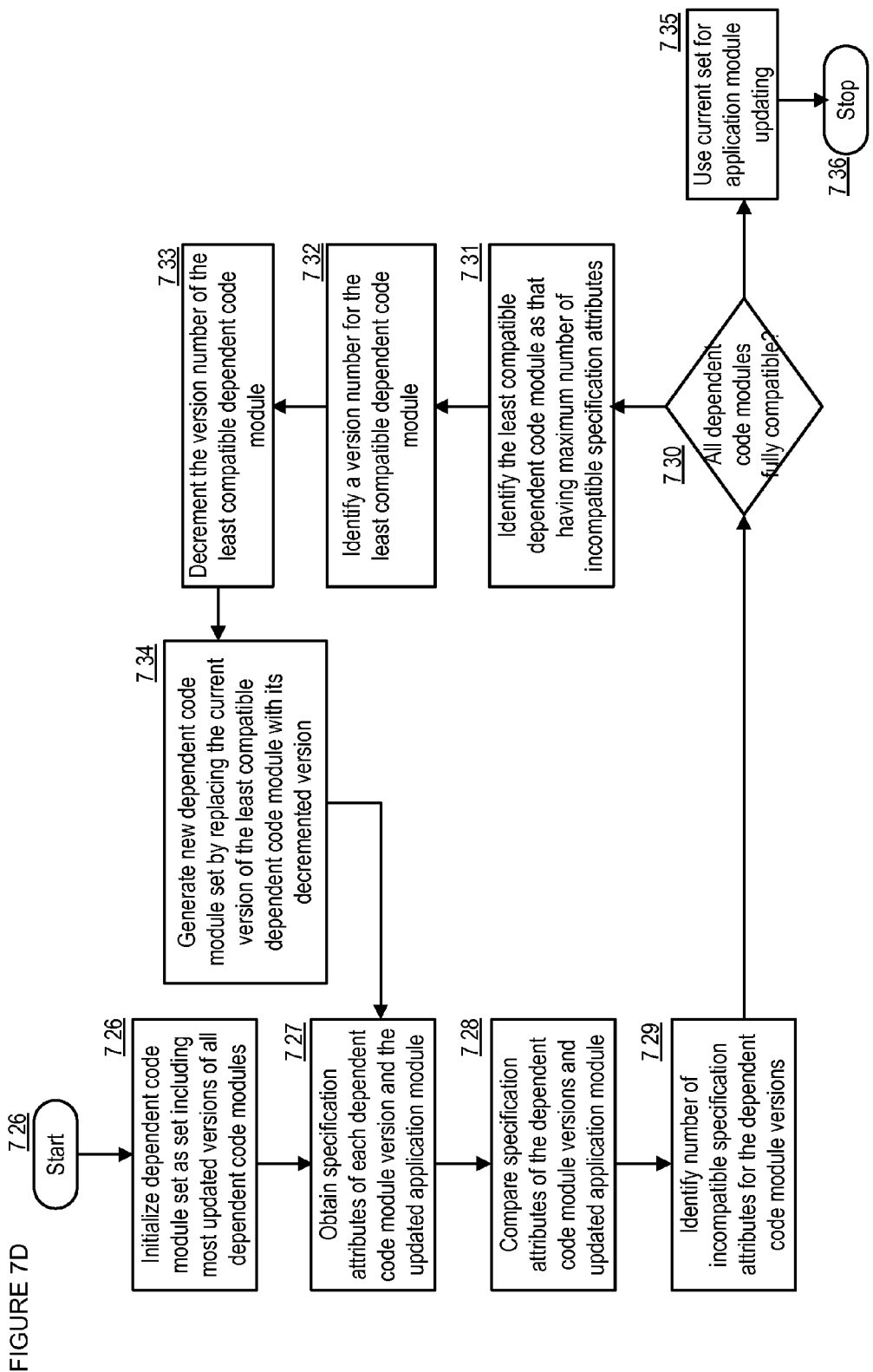

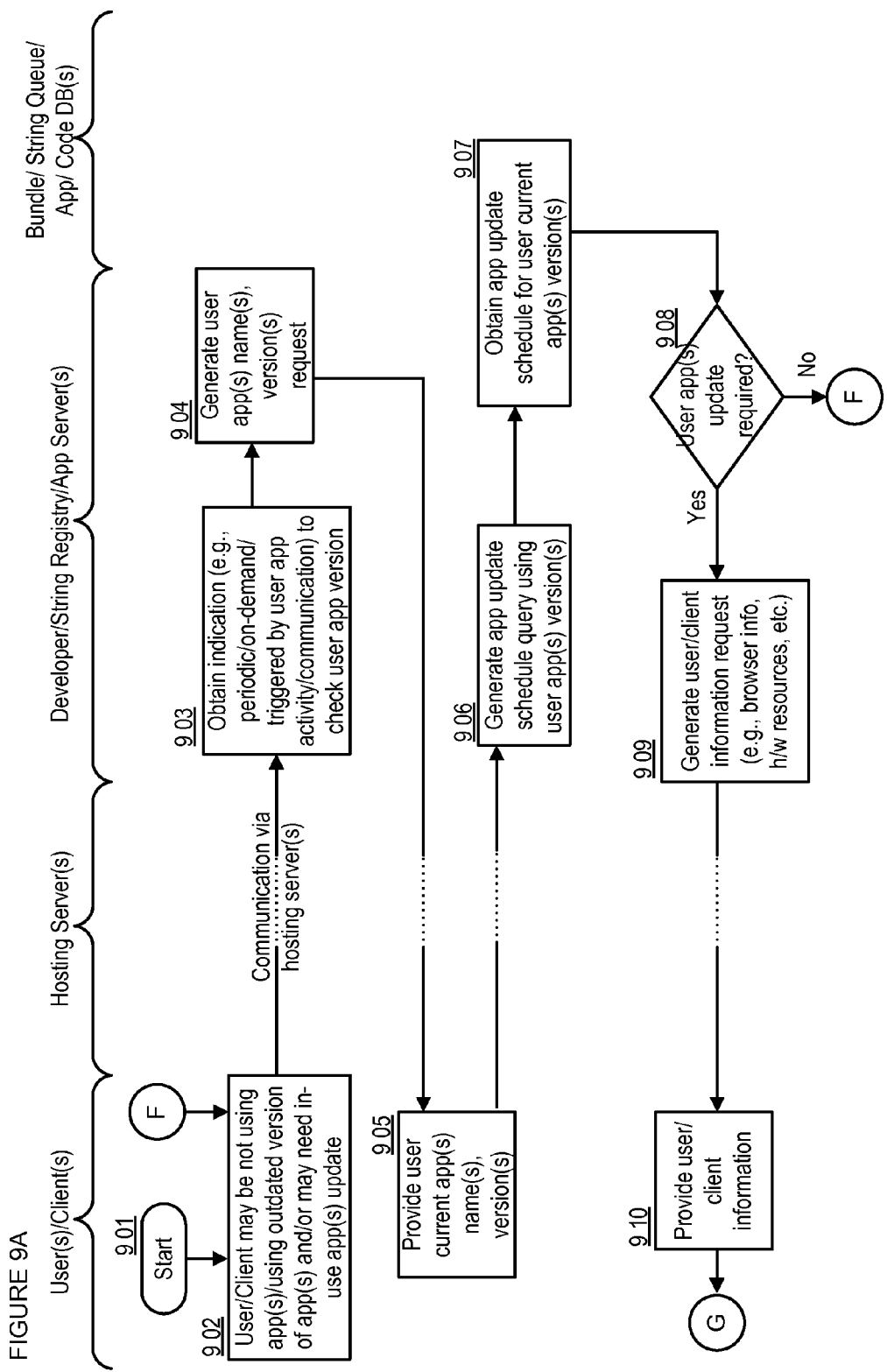

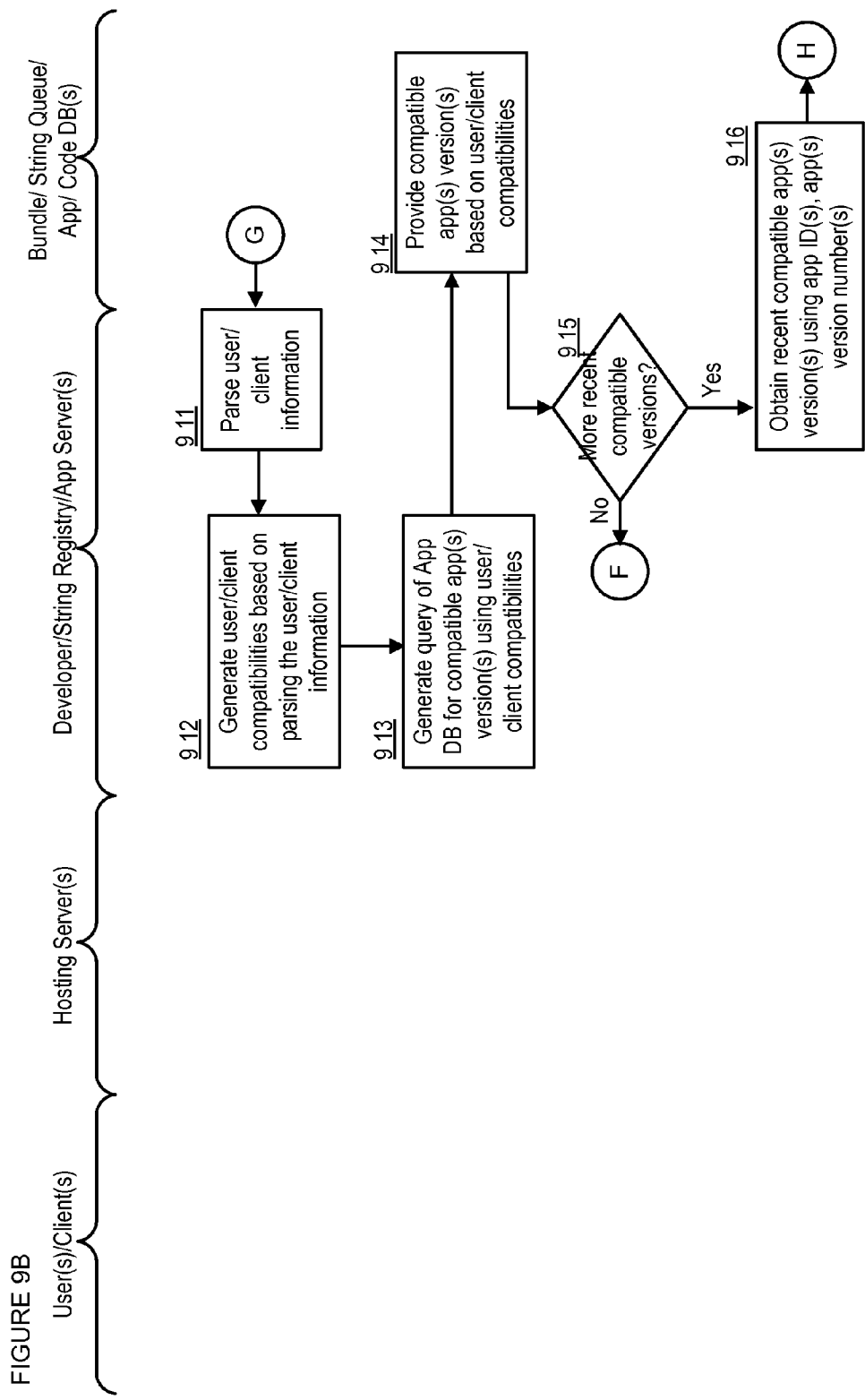

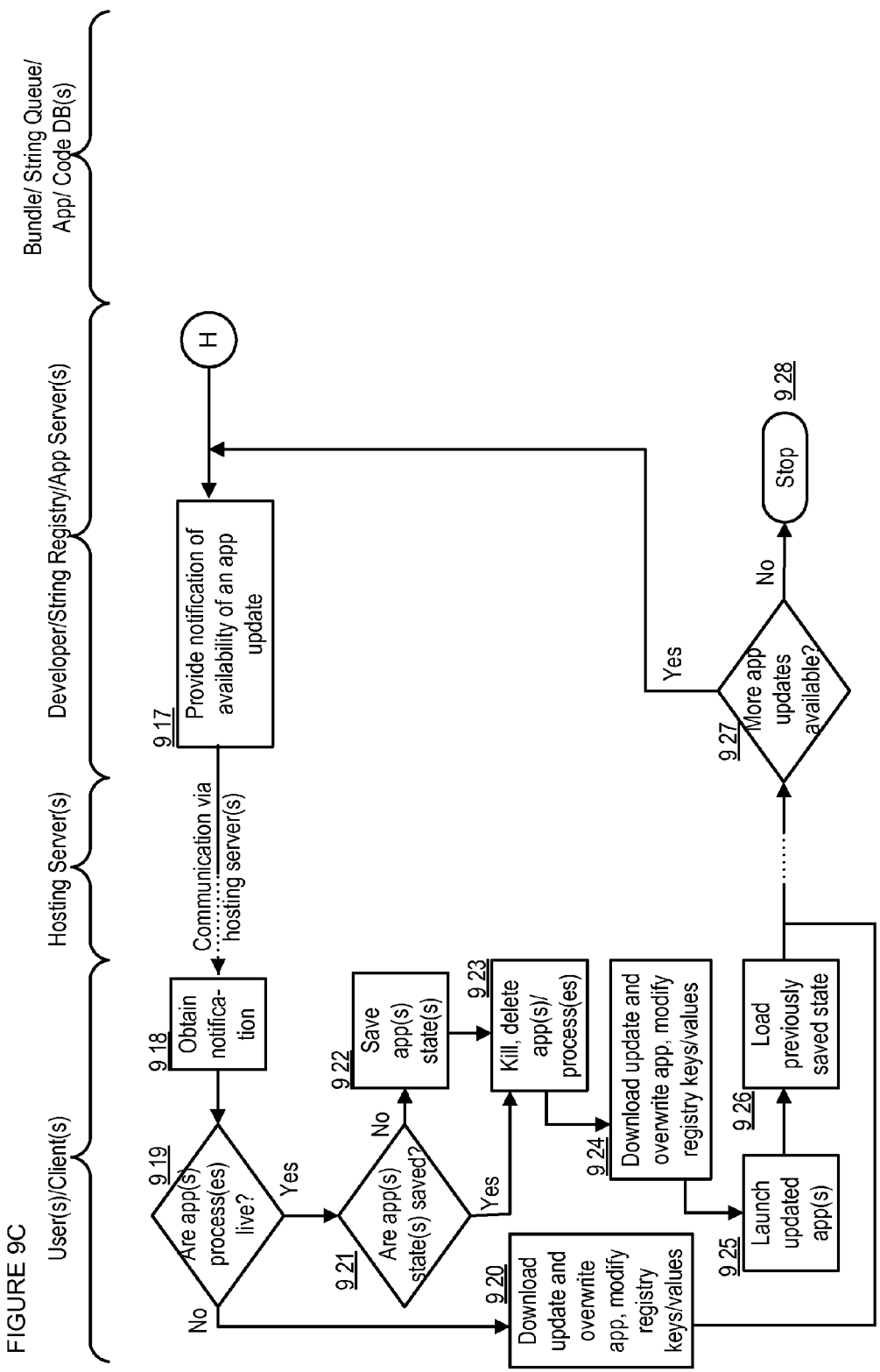

APPARATUSES, METHODS AND SYSTEMS FOR APPLICATION PROGRAMMING INTERFACE CALL ABSTRACTION

CLAIM OF PRIORITY

This application is a continuation of U.S. patent applicant Ser. No. 13/244,699 (issued as U.S. Pat. No. 8,375,384), filed on Sep. 26, 2011, entitled "SYSTEM AND METHOD FOR SOCIAL NETWORKING APPLICATION UPDATER," which is a continuation of patent application Ser. No. 12/885,133 (since issued at Pat. No. 8,832,676), filed on Sep. 17, 2010, entitled "APPARATUSES, METHODS AND SYSTEMS FOR A SOCIAL NETWORKING APPLICATION UPDATER," which claims priority under 35 USC §119 to U.S. provisional patent application Ser. No. 61/277,978 filed Sep. 30, 2009, entitled "FRAMEWORK TO ABSTRACT SOCIAL NETWORK API CALLS," and U.S. provisional patent application Ser. No. 61/277,950 filed Sep. 30, 2009, entitled "SOCIAL NET APPLICATIONS UPDATE DYNAMICALLY AS CODE IS CHECKED-IN." The entire contents of the aforementioned applications are herein incorporated by reference in its entirety.

FIELD

The present invention is directed generally to apparatuses, methods, and systems for social networking, and more particularly, to apparatuses, methods and systems for abstraction of a social networking application API call.

BACKGROUND

Software application developers often rework existing software application code, and create new versions of their software application code. Application programming interfaces ("APIs"), such as those offered to application developers by social networking platform hosts, are created to allow programmers and users to access various libraries of software code. Many social networking systems are based on various web programming codes and APIs.

SUMMARY

The apparatuses, methods and systems for application programming interface call abstraction provide real-time updating of input string fields within a multi-user social networking applications in highly dynamic build environments.

In one embodiment, a method for application programming interface (API) call abstraction is disclosed, comprising: obtaining programming code for an application; parsing the obtained programming code to identify instructions in the programming code; identifying an API call in the programming code based on parsing the obtained programming code, the API call including an input string; determining that the identified API call requires a pre-registered bundle to replace the input string; querying a database to obtain details of the pre-registered bundle using the input string, the details of the pre-registered bundle used to update the programming code for the application.

In another embodiment, a system for application programming interface call abstraction is disclosed. The system includes a processor and a memory disposed in communication with the processor and storing processor-executable instructions, the processor executable instructions including instructions to obtain programming code for an application; parse the obtained programming code to identify instructions in the programming code; identify an API call in the programming code based on parsing the obtained programming code, the API call including an input string; determine that the identified API call requires a pre-registered bundle to replace the input string; and query a database to obtain details of the pre-registered bundle using the input string, the details of the pre-registered bundle used to update the programming code for the application.

In yet another embodiment, a processor-readable medium storing processor-executable instructions for application programming interface (API) call abstraction is disclosed. The instructions are configured to: obtain programming code for an application; parse the obtained programming code to identify instructions in the programming code; identify an API call in the programming code based on parsing the obtained programming code, the API call including an input string; determine that the identified API call requires a pre-registered bundle to replace the input string; and query a database to obtain details of the pre-registered bundle using the input string, the details of the pre-registered bundle used to update the programming for the application.

Other aspects of the invention will become apparent from the following detailed description, taken in conjunction with the accompanying drawings, illustrating by way of example the principles of the invention.

BRIEF DESCRIPTION OF THE DRAWINGS

The accompanying appendices and/or drawings illustrate various non-limiting, example, inventive aspects in accordance with the present disclosure:

FIGS. 4A-C are of logic flow diagrams illustrating aspects of API call abstraction in some embodiments of the SNAM;

FIGS. 7A-D are of logic flow diagrams illustrating aspects of social networking application updating in some embodiments of the SNAM;

FIGS. 9A-C are of logic flow diagrams illustrating aspects of social networking application update deployment in some embodiments of the SNAM.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

Social Networking Application Manager (SNAM)

Figure 1:
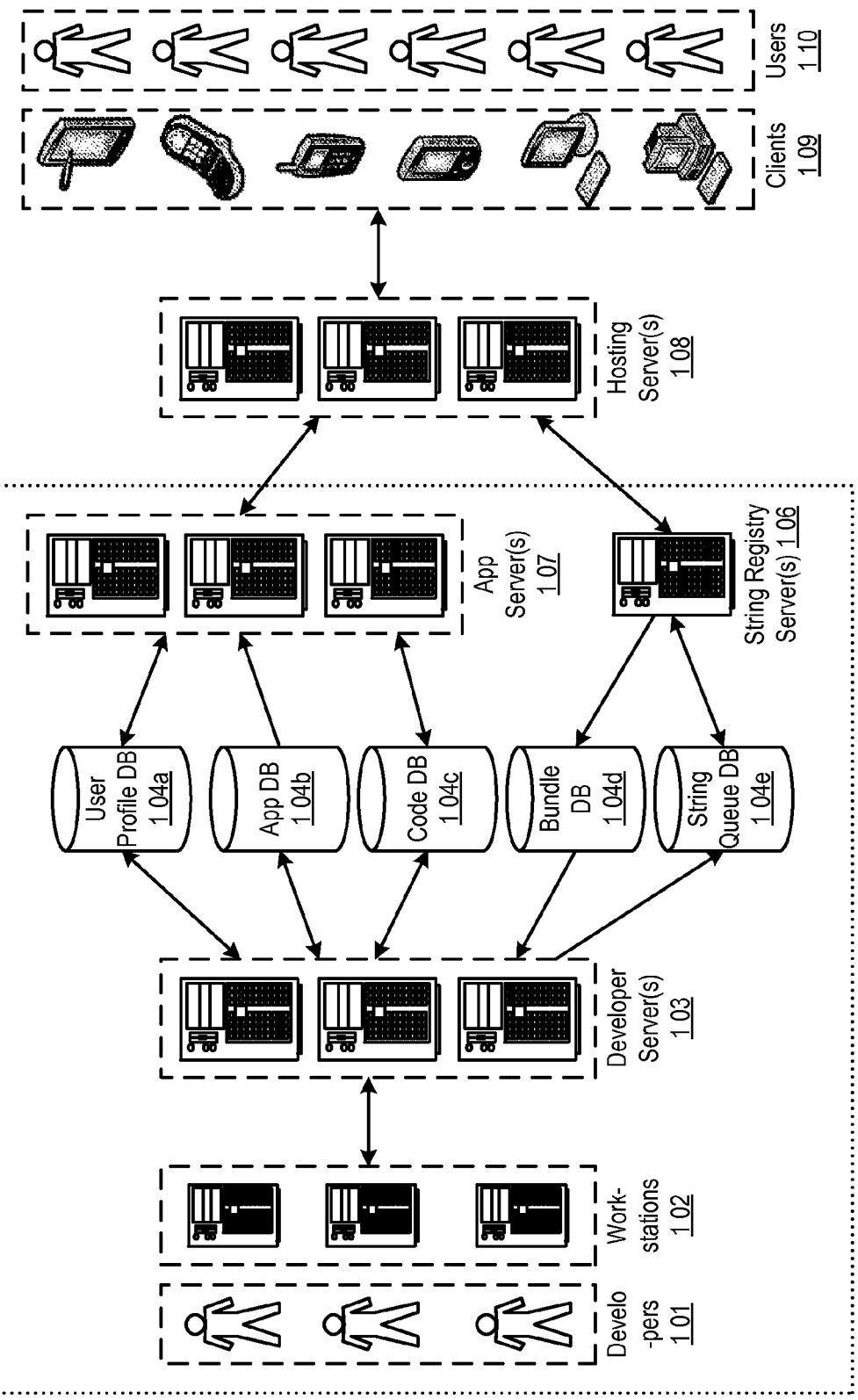
FIG. 1 is of a block diagram illustrating various Social Networking Application Manager ("SNAM") components and/or affiliated entities involved in live reconciliation of code updates in some embodiments of the SNAM.

FIG. 1 is of a block diagram illustrating various Social Networking Application Manager ("SNAM") components and/or affiliated entities involved in live reconciliation of code updates in some embodiments of the SNAM. A variety of other compositions and arrangements of SNAM components and/or affiliated entities may be used in alternative embodiments of the SNAM as is further discussed in FIG. 10.

In some implementations, the SNAM may include a developer system 100. Developer system 100 may provide social networking applications (e.g., multi-user online games) for users 110. The users may interact with the developer system via a variety of clients 109. In some implementations, the developer system may interact with the users and/or clients via a hosting server 108. For example, the hosting server 108 may be included within the computing infrastructure of a social networking website providing social networking services for the users. In some implementations, the hosting server 108 may provide one or more application programming interfaces ("APIs") for the developer system to interface with the hosting server and with any users associated with the hosting server and/or social networking website for which the hosting server provides one aspect of computing infrastructure. In some implementations, the hosting server may provide a wide variety of APIs for the developer system 100. For example, the hosting server may provide APIs via which the developer system may obtain/modify/append user profile information, user data (e.g., e-mail, text messages, blog posts, microblogs, tweets, status messages/updates), user associated media content (e.g., audio/video files etc.), RSS and/or other news feeds, social graph information pertaining to users of a social networking service/website hosted by the hosting server, and/or the like.

In some implementations, developer system 100 may include one or more app servers 107. An app server may provide one or more social networking applications (e.g., multi-user online games) for the users and/or clients. For example, the app server may provide a custom client-side application for a client. The client-side application may execute on a client of a user. In some implementations, the client-side application may communicate and/or exchange data/media with an app server included in the developer system to provide social networking application functionality for the user. In other implementations, a generic web browser, telnet, command-line and/or other application interface/environment may be available on a client, and may interface with an app server included in the developer system. In some implementations, an app server may utilize one or more APIs provided by hosting server to communicate with the client/user. The app server may also utilize the APIs provided by the hosting server to obtain/modify/append user profile information, user data (e.g., e-mail, text messages, blog posts, microblogs, tweets, status messages/updates, message/calls, data structures/parameters passed as encapsulated and/or distributed objects, and/or the like), user associated media content (e.g., audio/video files etc.), RSS and/or other news feeds, social graph information pertaining to users of a social networking service/website hosted by the hosting server, and/or the like. In some implementations, the developer system may include one or more databases, including a user profile database 104a, app database 104b. The app database 104b may store one or more applications developed for execution on the app servers and/or on clients. In some implementations, an app server with which a client is interacting may select an application stored in the app database to provide for the client based on properties of the client (e.g., type of client, location, language settings, user preferences, browser locale etc.). The app server may then obtain the application from the app database and provide the app for the client. In alternate implementations, an app server may load onto itself an application from the app database based on the properties of the client with which the app server is required to interact. In some implementations, during interaction of an application executing on a client with an application executing on an app server, data pertaining to a user and/or client may be generated. For example, an app server may be executing a multi-user online gaming application in which a user using a client running a client-side application is taking part. As part of the experience provided by the application executing on the client and app server, user data (e.g., game state, user messages, user profile updates, etc.) may be generated. In some implementations, such user data may be stored in a user profile database 104a included within the developer system. In some implementations, the app server may utilize data stored in the user profile database of the developer system and/or data obtained from the hosting server (e.g., social networking data of the user from a social networking website implemented on the hosting server) to provide various social networking application features for the user.

In some implementations, the hosting server providing APIs for the app servers of the developer system may require the app servers utilizing the APIs to adhere to policies and/or regulations imposed by each of the provided APIs. For example, an API may require that an input string to the API may only be chosen from a known set of fixed string templates. In some implementations, a fixed input string template including one or more variable fields and/or text (hereinafter "bundle") and an identification tag ("bundle ID") associated with the bundle may be stored in a bundle database 104d included in the developer system. The hosting server APIs may require that any input strings not previously used by the developer system be first registered with the hosting server. Accordingly, in some implementations, the developer system may include a string registry server 106 that interfaces with the hosting server. The string registry server may accept requests from one or more entities included within the developer system to register new input strings for APIs provided by the hosting server. The string registry server may then coordinate registration of the new input strings with the hosting server by communicating with the hosting server. In some implementations, the string registry server may be disposed in communication with a string queue database 104e storing one or more queues of string registration requests from the entities included within the developer system. A bundle database 104d may also be provided for in the developer system, wherein the bundle database stores information on bundles that have been previously registered with the hosting server. In some implementations, the string registry server may coordinate registration of new input strings stored in the string queue database with the hosting server, update the bundle database with the results of registration of the new input strings with the hosting server, and remove from the queue database requests that have successfully been serviced from the string queue database.

In some implementations, the applications stored in the app database 104b may be compiled from source code stored in a code database 104c included within the developer system. In some implementations, applications may be compiled from source code in the code database prior to deployment of the application to users and/or clients of the developer system and/or affiliated entities (e.g., social network hosted by hosting server). In alternate implementations, source code from the code database may be compiled at runtime and/or on-the-fly during deployment to users and/or clients. In further implementations, instructions from source code may be read by the app servers (e.g., line-by-line) directly from the code database and implemented as they are read by the app servers to provide social networking application services to the users and/or clients. In implementations wherein source code from the code database is compiled prior to run time, such compilation may be performed by developer servers 103 included within the developer system. In some implementations, a developer server may obtain source code from the code database for compilation. The source code may include one or more API calls using APIs provided by the hosting server. In such instances of compiling code including API calls, the developer server may query the bundle database for information on a bundle corresponding to the input provided to the API call in the code. If a bundle corresponding to the input for the API call in the source code is available in the bundle database, the developer server may utilize bundle information obtained from the bundle database in the compilation procedure. If, however, no bundle corresponding to the input for the API call in the source code is available in the bundle database, the developer server may submit a request for registration of a new input string corresponding to the input provided to the API call included in the source code to the string queue database. The string registry server may coordinate with the hosting server to register the new input string submitted by the developer server, and upon completion of string registration, the string registry server may notify the developer server of availability of a newly generated bundle corresponding to the provided new input string stored in the bundle database. The developer server may obtain the new bundle, and continue the compilation procedure using the generated bundle. Upon completing the compilation procedures, the developer server may store the generated compiled application in the app database.

In some implementations, the SNAM may provide social networking application services for a large number of users utilizing a wide variety of client devices/systems. Such client devices may be utilizing a wide variety of operating systems types/versions/builds/service packs, network connection types, connection bandwidths, display screen sizes, web browser environments, browser locales, language and/or other personalization settings, communication interfaces and/or like client device/system preferences/settings. Some client devices may obtain standalone custom applications (e.g., from the app database via an app server), while other client devices may utilize modern web technologies (e.g., JavaScript™, Adobe Flash®, HTML5, etc.) via a web browser to provide social networking application services for the users. Accordingly, in some implementations, the developer system may generate, store and maintain a large number of code modules, code versions, application modules, application versions, module/application dependency graphs, application/module specifications, compatibility lists, and/or the like, to provide social networking application services to a broad user/client audience. In some implementations, the developer system may include a plurality of developers 101 producing software code for a wide range of modules and/or applications designed to satisfy a wide range of user preferences and/or operate in a variety of client computing environments. The developers may produce such software code at a plurality of workstations 102. In some implementations, the developers/workstations may provide various application/module code submissions for the developer servers, using which the developer servers may compile applications/modules for providing the social networking application services for the users of the hosting server/developer system. Accordingly, in some implementations, the developer system 100 may generate, store, maintain and/or deploy various versions of developer/workstation-provided software code, modules, applications and/or the like at any given time.

Figure 2:
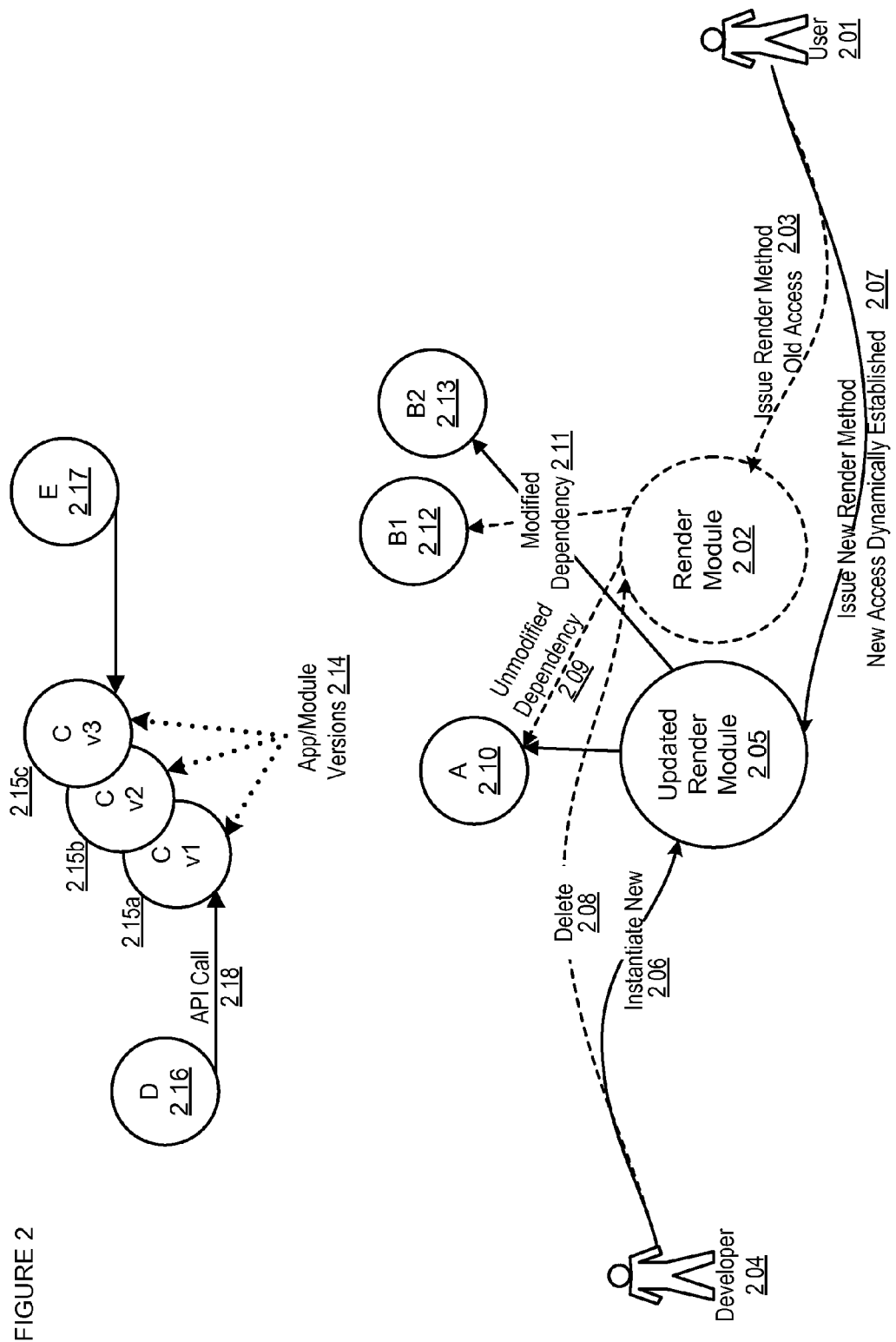
FIG. 2 is of a block diagram illustrating aspects of live reconciliation of code updates in some embodiments of the SNAM.

FIG. 2 is of a block diagram illustrating aspects of live reconciliation of code updates in some embodiments of the SNAM. In some implementations, a user 201 may wish to utilize an application module (e.g., render module 202). The user's client may issue a request (e.g., 203) to a server to access the desired application module. In response to the user's request, the server may provide the requested application module. The application module (e.g., render module 202) may utilize other application modules ("dependent application modules"), e.g. A 210, B 212, etc., to provide its designed features for the user. In some implementations, an application module ("calling application module"), e.g., D 216, may utilize a dependent application module (e.g., C v1 215a) via an application programming interface ("API") call (e.g., 218).

In some implementations, a software application developer may contemplate modifications to an application module being utilized by the user. For example, with reference to FIG. 2, the developer may contemplate modifications to render module 202, so as to generate updated render module 205. The developer may contemplate modifications to an application module for a variety of reasons. For example, the developer may contemplate modifications including, but not limited to, ones that enhance the range of features provided to the user/client, improve the speed/responsiveness of the application module, fix bugs identified in prior version of code corresponding to the application module, and/or the like. The developer may input (e.g., manually enter) the contemplated modifications to the code of the module to generate an updated code module. The developer may provide the updated code module to the app facility. In response, the app facility may compile the updated code module, and generate an updated version of the application module (e.g., updated render module 205). In some implementations, an updated version of an application module may utilize a different set of dependent application modules than the original version of that application module. For example, with reference to FIG. 2, the updated render module 205 and original render module 202 both may utilize application module A 210. However, the updated render module 205 may utilize application module B2 213, while the original render module 202 may utilize application module B1 212 instead of application module B2 213.

In some implementations, a user may be utilizing an application module for which the app facility has generated an updated version. In such implementations, the app facility may attempt to transfer the user from the user's version of the application module to the updated version. For example, the app facility may generate an instance of the updated version of the application module (e.g., updated render module 205), and generate instances of the dependent application modules (e.g., A 210, B2 213) utilized by the updated version. The app facility may issue a new access request (e.g., 207) for the updated version of the application module on behalf of the user, and dynamically establish access for the user to the updated version. The app facility may then delete 208 any instances of outdated versions (e.g., render module 202) of the application module and delete instances of any dependent application modules (e.g., B1 212) not being utilized by the updated version of the application module. In some implementations, the developer system may perform such transfer of users from one application module version to another dynamically (e.g., 230) in real-time, while the user is continuously utilizing the multi-user social networking application, as discussed further in this disclosure.

In some implementations, a multi-user social networking application may comprise a plurality of application modules (e.g., 202, 205, 210, 212-213, 215a-c, 216-217). An application module may be designed to execute within a server and/or client computing environment. In some implementations, the developer system may compile a plurality of versions of a single application module (e.g., 215a-c). In some implementations, different versions 214 of the same application module (e.g., 215a-c) may be utilized in different application scenarios. For example, with reference to FIG. 2, application module D 216 may utilize version 1 (215a) of application module C. Application module E 217, however, may utilize version 3 (215c) of application module C. The version of an application module utilized in an application scenario may depend on various factors including, but not limited to: user preferences (e.g., language, type of user experience such as normal/HD video, etc.), client device type, hardware installed on the client, software resources available at the client, the features that the application is required to provide for the user, the server computing environment, and/or the like.

Application Programming Interface (API) Call Abstraction

Figure 3:
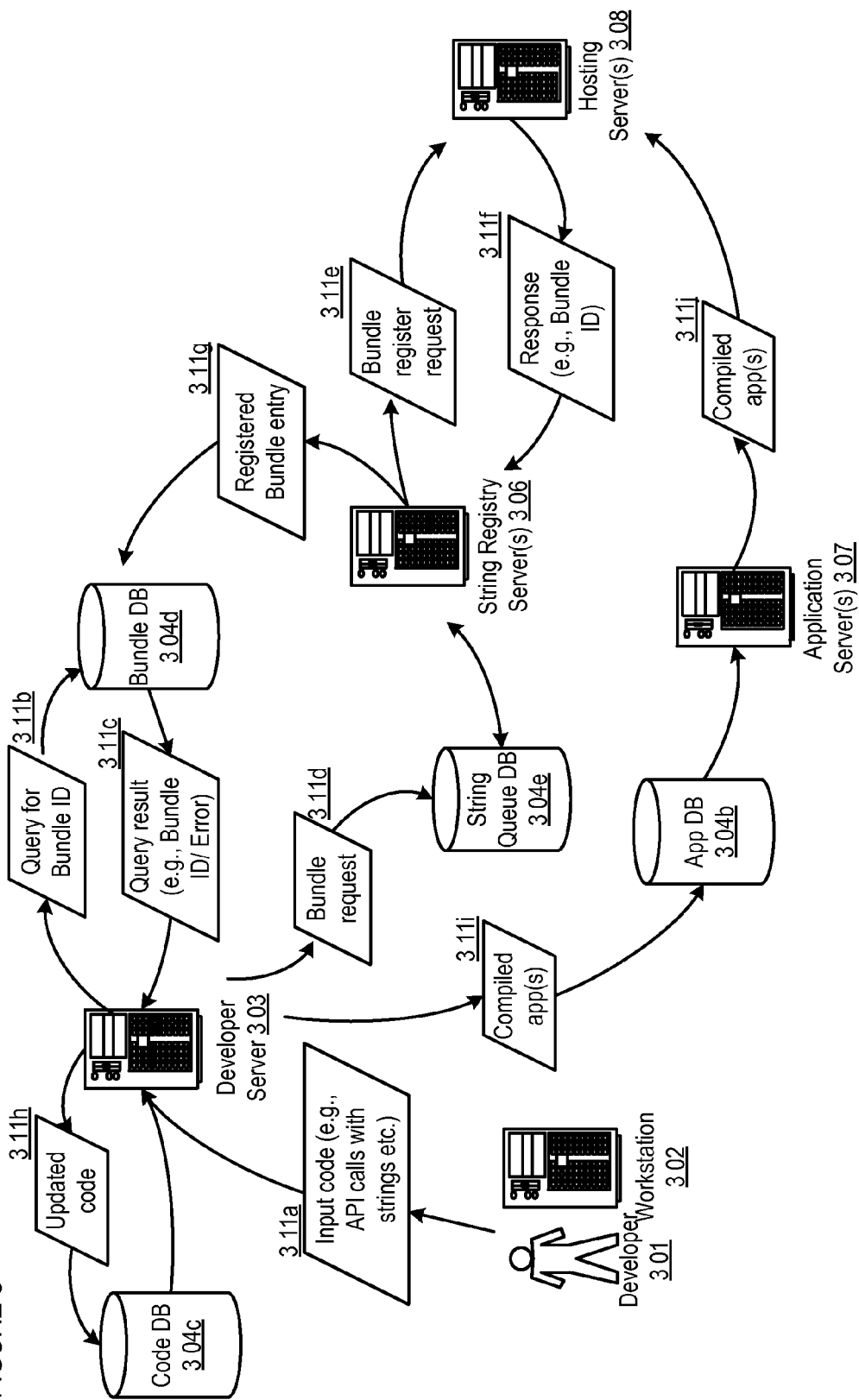
FIG. 3 is of a data flow diagram illustrating aspects of application programming interface ("API") call abstraction in some embodiments of the SNAM.

FIG. 3 is of a data flow diagram illustrating aspects of application programming interface ("API") call abstraction in some embodiments of the SNAM. In some implementations, a developer 301 may contemplate modifications to a code module utilized by a multi-user social networking application. The developer 301 operating workstation 302 may provide input code 311a including such modifications to update such a code module. For example, the developer may input a code module including commands similar to the exemplary listing provided below. In some implementations, the input code may include references to other code/application modules in order to provide the desired capabilities of the updated code module. For example, the references may include API calls to other code/application modules. An exemplary listing illustrating substantive aspects of including an API call within a code module, written substantially in the form of server-side Hypertext Preprocessor ("PHP") script, is provided below:

```
<?PHP
header('Content-Type: text/plain');
$message = "{*actor*} uploaded a new video.";
$target_id = 1234567;
$hostserver->api_client->stream_publish($message, $target_id);
?>
```

In some implementations, the input code module may include API calls to APIs provided by the hosting server 308. In the example listing presented above, the code input by the developer makes an API call to the stream_publish( ) module provided by the hosting server $hostserver. The developer may provide one or more inputs for the API along with the API call. For example, in the example listing presented above, the developer includes a message string ($message) and a target ID ($target_id) as inputs for the API call to the stream_publish( ) procedure. In some implementations, the hosting server may provide an API for a developer system to post a user-customizable text string as newsfeed content to a newsfeed of a user of a social networking site hosted by the hosting server. The developer may include a call to such an API in the input code module, and provide an input text string (e.g., $message), a user ID (e.g., $target_id), and values for fields (e.g., {*actor*}) included in the input text string to the API via the API call, such that the API may publish the text string, customized based on the values for fields provided with the API call, to a newsfeed of a user identified by the provided user ID.

In some implementations, a developer server 303 may obtain the input code provided by the developer and/or workstation, and analyze the obtained code in order to compile the code into an application, and/or prepare the code for use at run-time/on-the-fly. In some implementations, the developer server may parse the input code to identify API calls within the provided code. An exemplary listing for parsing a code file submitted by a developer to identify API calls, written substantially in the form of PHP commands, is included below in the discussion with reference to FIGS. 4A-C. Based on parsing the code update provided by the developer, the developer server may identify an API call to an API provided by the hosting server within the input code update. The developer server may also identify an input string provided to the API in the API call, based on parsing the input code for input strings in a manner similar to that used to identify API calls within the input code update. The developer server may extract identified input strings from the input code and save them for future processing. An exemplary listing for extracting input strings and savings the extracted strings to a results file is included below in the discussion with reference to FIGS. 4A-C. The hosting server may, in some implementations, require that all input strings provided via API calls to modules provided by the hosting server be pre-registered with the hosting server, wherein pre-registration results in the hosting server providing a bundle ID identifying a bundle comprising an input string, and customizable fields associated with the input string. Accordingly, in some implementations, the developer server may, in response to identifying an input string in an API call to an API provided by the hosting server, generate a query for a bundle ID associated with the identified input string. For example, the developer server may execute a PHP script that interfaces with a relational database responsive to Structured Query Language (SQL) commands. Exemplary PHP/SQL commands for querying a database for an identifier stored in a database using an input string as a search query are include below in the discussion with reference to FIGS. 4A-C. In some implementations, the developer may query 311b a bundle database 304d for a bundle ID using the generated query. The bundle database 304d may store bundle records with fields including, but not limited to, a bundle ID, a bundle type, bundle fields, bundle field types, hosting server ID, and/or the like. Upon receiving the query for the bundle ID associated with the input string, the bundle database may return a query result 311c including one or more of the fields stored in the bundle records (e.g., bundle ID). However, if a bundle record corresponding to the input string queried for does not exist in the bundle database, the bundle database may generate and provide an error message (e.g., a null result) for the developer server.

In some implementations, if the developer server obtains an error message from the bundle database indicating that no bundle ID exists for the input string in the API call, the developer server may generate a request for a new bundle corresponding to the input string. The developer server may submit the bundle request 311d to a string queue database 304e. For example, the developer server may generate a new database record, and store the database record in a bundle request database. The bundle record may include fields such as, but not limited to: an identifier (e.g., IP address) of an originator of the bundle request, an input string for which a new bundle ID is requested, variables/fields included in the input string, an identifier of a module being called that requires the bundle ID, a name of the module being called, a name of the host server providing the module, a number of prior attempts to register the input string, a timestamp associated with the bundle request, and/or the like. An exemplary listing of PHP/SQL commands to generate a new bundle record, populate it with data such as those above, and store the bundle request in a database is included below in the discussion with reference to FIGS. 4A-C. In some implementations, the string queue database may store one or more queues of bundle requests submitted by various entities including developers, workstations, developer servers, app servers, etc. A string registry server 306 may query the string queue database for pending bundle requests and obtain a bundle request from the string queue database. The string registry server may then generate a bundle register request based on the obtained bundle request from the string queue database, and provide the bundle register request 311e to the hosting server for the API being called in the input code. In some implementations, the string registry server may query the string queue database for the number of records stored in the string queue database, and determine the number of pending requests based on the number of records stored in the string queue database. In some implementations, the string registry server may obtain a plurality of requests stored in the string queue database, and combine the bundle requests into a batch of bundle requests. For example, the string registry database may obtain the bundle request records, extract the input strings included in the records, append the input strings in a bundle registration request batch array, and provide the bundle request batch array to the hosting server to process the pending bundle requests as a batch. Exemplary PHP/SQL commands for implementing the above procedure are included below in the discussion with reference to FIGS. 4A-C. The hosting server 308, upon obtaining the bundle register request(s), may register the input string(s) corresponding to the bundle register request(s), and provide details of the registered bundle(s) as a response 311f to the string registry server (e.g., as a HTTP(S) POST message including data encoded according to the eXtensible Markup Language ("XML") in the message body, such as the exemplary data listing included below in the discussion with regard to FIGURES A-C). Upon obtaining the response from the hosting server, the string registry server may parse the response obtained from the hosting server and extract the bundle ID(s) from the obtained hosting server response. For each obtained bundle ID, the string registry server may create a new record in the bundle database corresponding to the newly registered bundle using, for example, PHP/SQL commands similar to those presented above for storing new bundle requests in the string queue database. In some implementations, the string registry server may also notify the developer/workstation/developer server that originated the bundle request that the bundle request has been successfully processed, and that a new bundle ID corresponding to the bundle request may be available in the bundle database. For example, the string registry server may provide a HTTP(S) POST message to notify the developer/workstation/developer server of bundle request processing. An exemplary HTTP POST message for notification of completion of bundle request processing is provided below:

```
POST /developers/bundles.php HTTP/1.1
Host: www.developersystem.com
User-Agent: Mozilla/4.0
Content-Type: Application/XML
Content-Length: 301
<?XML version = "1.0" encoding = "UTF-8"?>
<bundle_request_ack>
<request_id>ind\blore\a46763231</request_id>
<timestamp>2010-05-23 21:44:12</timestamp>
<developer_ip>202.85.34.91</developer_ip>
<developer_md5_auth>bb311b03062d60eccb0dec7c7863d991-
</user_md5_auth>
<bundle_id>AF81674</bundle_id>
</bundle_request_ack>
```

The string registry server may also remove the request corresponding to the registered input string from the string queue database upon completion of processing of the submitted bundle request.

In some implementations, upon obtaining notification that the bundle request has been successfully processed, the originator of the bundle request (e.g., the developer server) may query 311b the bundle database for the new bundle ID corresponding to the originally submitted bundle request. The bundle database may respond to the query by providing the bundle details (e.g., bundle ID) for the newly registered bundle for the originator. In some implementations, such bundle processing may be performed by the developer system until bundle IDs are obtained for all the input strings included with API calls in the modified code that required bundle IDs. Upon obtaining the bundle IDs, the developer server may update the code submitted by the developer using the bundle IDs from the bundle database. For example, the developer server may parse the code submitted by the developer for the input strings corresponding to the bundle IDs, identify the input strings in the code, and replace the input strings with the bundle IDs provided by the bundle database. The developer server may store fully-updated/intermediate-update code 311h to code database 304c. In some implementations, once the modified code submitted by the developer has been updated completely to include bundle IDs for all API calls in the code that require bundle IDs, the developer servers may provide the finalized code for storage in the code database, and/or may compile the finalized code into an app module. The developer may provide the compiled app 311i for storage in an app database 304b. An application server may access compiled app(s) stored in the app database and/or finalized code stored in the code database and provide 311j the app(s) and/or code for deployment to the hosting server and/or other intermediate entities that facilitate deployment of social networking applications to the users/clients of the developer systems and/or hosting server. In implementations wherein a user is currently utilizing a prior version of an app for which an updated app has been compiled according to the description above, the developer system may transfer the user from utilizing the prior app version to utilizing the updated compiled app dynamically in real-time while the user is continuously utilizing the multi-user social networking application, as discussed further below in this disclosure. In some implementations, a single instance of developer-provided code may make API calls to a plurality of hosting servers associated with a plurality of social networking service providers. In such implementations, the developer system may communicate with each of the hosting servers for bundle registration with the hosting servers as needed. The developer system may then update the API calls in the single instance of the code using the bundles associated with each of the hosting servers. In some implementations, a single instance of developer-provided code may be compiled into a plurality of apps and/or updated code modules, each app and/or updated code module optimized for making API calls to a different hosting server associated with a different social networking service provider. For example, when a user utilizes the developer-provided code module via a first hosting server associated with a first social networking service provider, the developer system may communicate with the first hosting server to perform bundle registration and API call updating based on the bundles associated with the first hosting server. The developer system may compile this version of the updated code into an app optimized to communicate with the first hosting server. When a user utilizes the same developer-provided code via a second hosting server associated with a second social networking service provider, the developer system may repeat the above procedure for the second hosting server. The developer system may then generate a second app optimized to communicate with the second hosting server. Accordingly, a single instance of developer-provided code may be utilized independently with a plurality of social networking service providers.

Figure 4A:
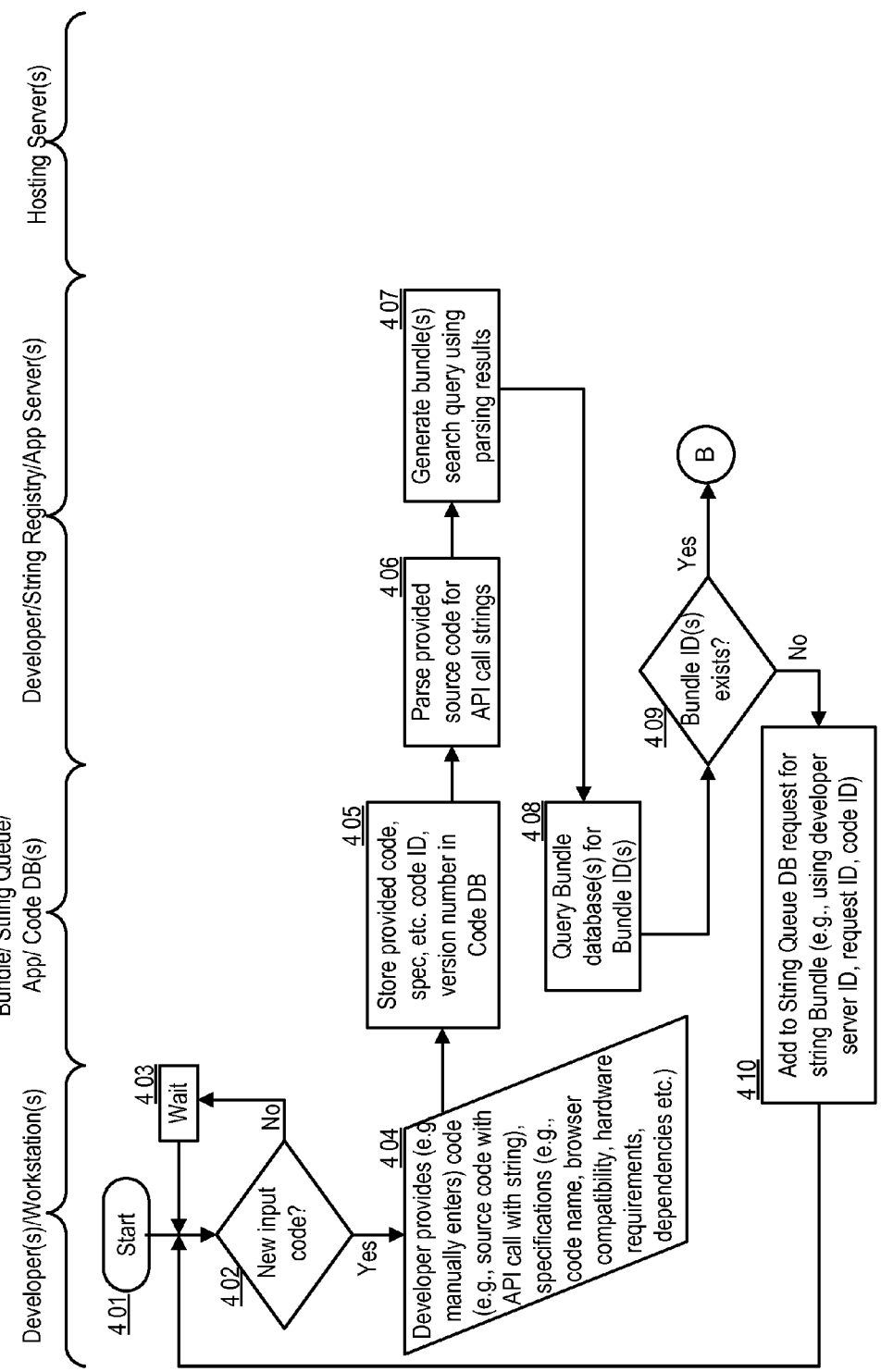
Figure 4B:
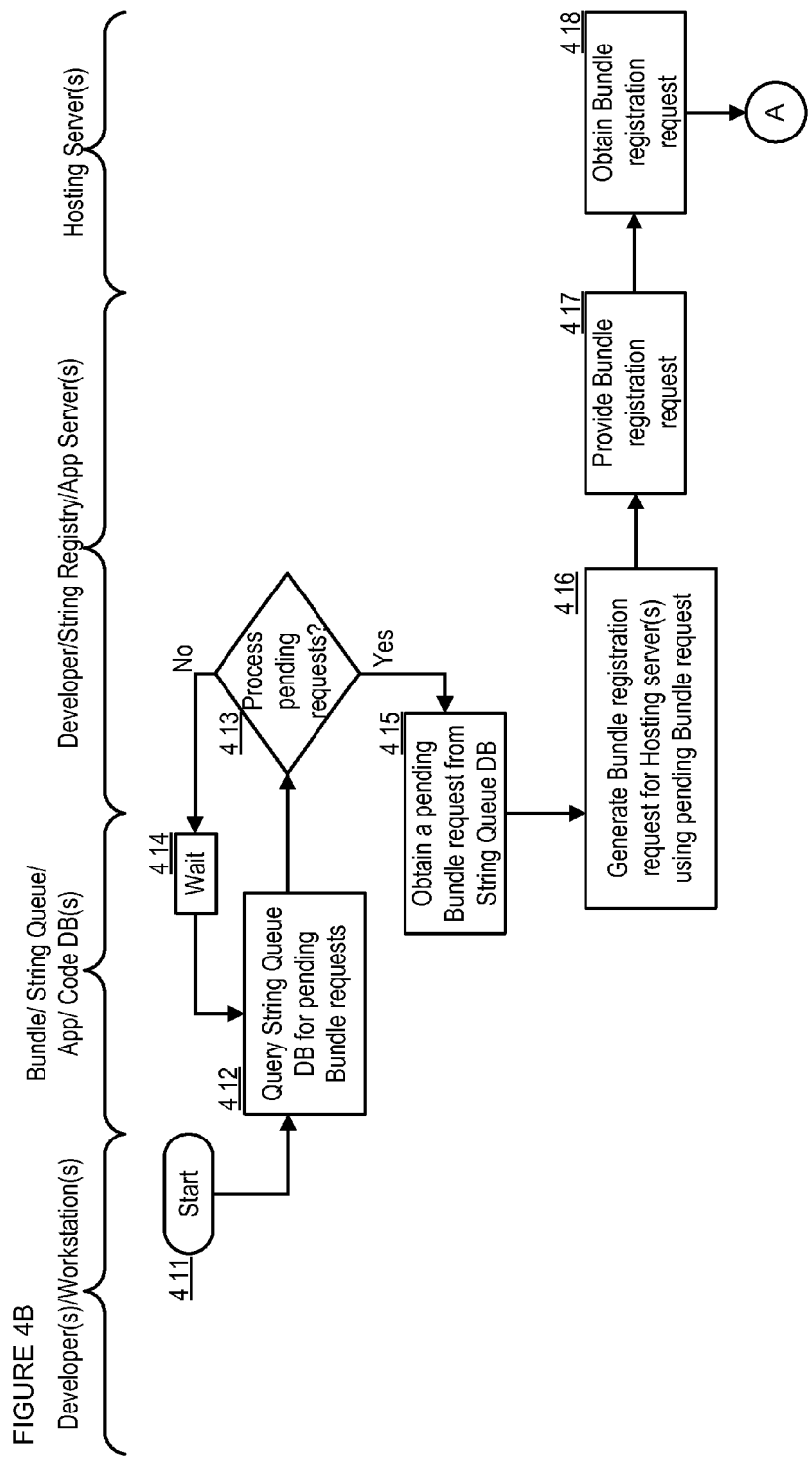

FIGS. 4A-C are of logic flow diagrams illustrating aspects of API call abstraction in some embodiments of the SNAM. In some implementations, API call abstraction may commence upon a developer providing input code via a workstation. For example, a workstation may continuously monitor 402 whether new code has been input 402 (e.g., manually by a developer) into the workstation, and wait 403 until the workstation detects (e.g., by detecting a keystroke on a keyboard disposed in communication with the workstation, an incoming file transfer, an incoming electronic message, etc.) that code has been input into the workstation. Alternatively, code updates to files may be triggered upon demand by the developer (e.g., submitting a saved code update for input), by a delegate method observing for such changes on demand, periodically (e.g., via cron, etc.), and/or the like. Upon detecting that new input code is being provided to the workstation, the workstation may obtain source code being provided 404. For example a developer may manually enter source code for an application module included among the applications providing the social networking application services for the user of the developer system. In some implementations, the input code may include API calls to APIs provided by the hosting server. The developer may provide one or more inputs for the API along with the API call. For example, the developer may provide an input text string, a user ID, and values for fields included in the input text string with the API call. In some implementations, the developer may also provide specifications for the provided input code. For example, the developer may provide information on what application module the code provided is directed to, whether the code is designed to be compiled, used as-is, at run-time, and/or compiled on-the-fly, whether the code is designed to be run on a server and/or client, the operating system brands and version numbers for which the code module is designed, web browser brands and version numbers with which the code may be compatible, hardware requirements that a computing system executing the code and/or its compiled application version must and/or preferably may satisfy in order for the code's instructions to be adequately implemented, a list of other applications and/or code modules on which the code depends in order to provide the design features, and/or the like. An exemplary XML-encoded data listing of application requirements such as those listed above is included below in the discussion with reference to FIGS. 7A-D.

In some implementations, the workstation obtaining the input code may assign a code ID to the provided input code, and may provide the code for storage 405 in the code database along with the developer-provided specifications and the assigned code ID. In alternate implementations, the workstation may provide the code to a developer server, which may then assign a code ID and provide the code ID, input code, and code specifications for storage in the code database. In some implementations, upon obtaining the input code, the developer server may parse 406 the code to identify API calls within the code. For example, an exemplary listing illustrating substantive aspects of parsing input code to identify API calls, written substantially in the form of PHP commands, is provided below:

```
<?PHP
header('Content-Type: text/plain');
$filename = "inputcode.php"; //name of code file to scan for API calls
$handle = fopen($filename, "r");//open code file for reading
$buffer = fgets($handle, 4096);//read code file contents into a buffer
$offset = 0;     //set location from which to start search
$search = "host_api"; //set name of API call to search for
$result = "results.txt";  //set filename for search results file
$open = fopen($result, "a"); //open search results file for appending
//perform search until the end of the code file for the API call
while(!feof($handle)) {
$pos = strpos($buffer, $search, $offset + 1);//find an occurrence
fwrite($open,$pos);  //save position of the occurrence
$offset = $pos;    //move start position of next iteration
}
fclose($open);  //close search results file
fclose($handle); //close input code file
?>
```

If API calls to an API of the hosting server are found within the input code, the developer server may obtain any input strings provided to the APIs via the API calls while parsing the input code for API calls. In some implementations, the developer server may save API call details including, but not limited to, the input strings provided in the API calls, the names of APIs called, and positions of such API calls, for further use in API call abstraction processing. An exemplary program listing illustrating substantive aspects of obtaining the input strings to API calls identified in the input code, written substantially in the form of PHP commands compatible with API call parsing commands such as in the example above, is provided below:

```
<?PHP
header('Content-Type: text/plain');
$start = strops($buffer, "(", $pos + 1);//identify start of input string for
//API call at position given by $pos
$end = strops($buffer, ")", $start + 1);//identify end of input string
$length = $end − $start;  //determine input string length
$string = substr($buffer, $start + 1, $length −1); //extract input string
fwrite($open, $string);  //save input string
?>
```

In some implementations, upon obtaining an input string to an API call from the input code, the developer server may generate 407 and provide 408 a query for a bundle ID corresponding to the input string provided with the hosting server API call, for example, by providing the input string and an ID of the API called within the input code to a bundle database, and requesting in return a corresponding bundle ID. For example, the developer server may utilize Structured Query Language (SQL) commands within a PHP script to interface with relational database management system (RDBMS) database(s). An exemplary listing illustrating substantive aspects of querying a bundle database for a bundle ID corresponding to an input string provided as part of an API call, written substantially in the form of PHP/SQL commands, is provided below:

```
<?PHP
header('Content-Type: text/plain');
function bundle_query($string, $api_name, $DBserver, $password) {
mysql_connect("204.192.85.202",$DBserver,$password); // access database server
mysql_select_db("Bundle.SQL"); // select database table to search
//create query for a bundle ID, bundle fields and host API name in the
//APIBundleTable table using '$api_name' and '$string' as search terms
$query = "SELECT bundle_id bundle_fields host_api_name
FROM APIBundleTable WHERE
host_api_name LIKE '%' $api_name AND input_string LIKE
'%' $string";
$result = mysql_query($query); // perform the search query
mysql_close("Bundle.SQL"); // close database access
return $result; // return search result
?>
```

In some scenarios, the bundle database may have stored a bundle ID corresponding to the query provided by the developer server. In such scenarios, the bundle database may return a bundle ID in response to the received query, and the developer server may continue (e.g., 409, Option 'Yes') operations including but not limited to, code updating, application module compiling, application deployment, and/or the like, as described further in this disclosure. However, in some scenarios, the bundle database may not have stored a bundle ID corresponding to the requested input string and API called in the input code (e.g., 409, Option 'No'). In such scenarios, the developer server may generate a bundle request, and provide the bundle request for queuing 410 in a string queue database. The bundle request may include, for example, the input string into the API call, the fields included in the string, an Internet Protocol ("IP") address of a developer workstation/server originating the input code, an ID of the code module in which the API call was made, a name of the API being called, a variable indicating the number of times registration with the host server has been attempted for the input string, a timestamp for the bundle request, and/or the like. An exemplary listing illustrating substantive aspects of providing a generated bundle request to a string queue database, written substantially in the form of PHP/SQL commands, is provided below:

```
<?PHP
header('Content-Type: text/plain');
mysql_connect("StringQueue.SQL"); // connect to string queue database
mysql_query("INSERT INTO BundleRequestTable (input_string bundle_fields origin_IP calling_module_ID host_api_name register_attempts timestamp");
VALUES ($string, $bundle_fields, $api_name, "0", time( )); // add bundle request
mysql_close("StringQueue.SQL"); // close connection to database
?>
```

In some implementations, the developer, workstation and/or developer server may monitor (e.g., continuously, periodically, on-demand, triggered by developer/user actions, through method delegates, etc.) the entities within the developer system for input code for new and/or updating social networking applications, store provided input code submissions, parse the code for API calls requiring bundle IDs, query the bundle database for corresponding bundle IDs, and submit bundle requests to the string queue database for input strings that do not have pre-registered bundle IDs stored in the bundle database. In some implementations, a string registry server may monitor the string queue database for pending bundle requests submitted by entities within the developer system. For example, the string registry server may query 412 the string queue database for stored bundle requests, and wait 414 for the number of records/results returned to be greater than a threshold number to begin bundle request processing, following which the string registry server may commence processing the pending requests (e.g., 413, Option Yes). For example, the string registry server may obtain the pending requests 415 stored in the string queue database, sorted according to timestamps corresponding to when each pending request was submitted. The string registry server may then generate a bundle registration request 416 (e.g., a batch comprising all pending requests, or a fixed number, of pending requests), remove the pending requests 423 that have been included in the request to be submitted to the hosting server, and provide 417 the bundle registration request for the hosting server. An exemplary listing illustrating substantive aspects of generating a batch of bundle registration requests, submitting the bundle registration requests, and removing the bundle registration requests from the queue, written substantially in the form of PHP/SQL commands, is provided below:

```
<?PHP
header('Content-Type: text/plain');
mysql_connect("204.192.85.202",$DBserver,$password); // access database server
mysql_select_db("StringQueue.SQL"); //select string queue database to search
//query database for pending bundle requests, sorted by time of submission
$query = "SELECT input_string bundle_fields origin_IP calling_module_ID host_api_name
register_attempts FROM BundleRequestTable ORDER BY timestamp ASC";
$result = mysql_query($query); // perform the search query
//if there are enough pending requests, process the requests in a batch
if (mysql_num_rows($result) > $threshold) {
$batch_request = array( ); //initialize batch request array
//determine number of requests to process
if (mysql_num_rows($result) > $limit)
$process = $limit;
else
$process = mysql_num_rows($result);
// combine the requests selected for processing into a request batch
for ($k = 1; $k <= $process; $k++) {
//extract details for a bundle request
$string = mysql_result($result, $k , mysql_field_name($result,1));
$IP = mysql_result($result, $k , mysql_field_name($result,3));
//append bundle request details to batch request array
$batch_request = array($batch_request, $string);
$origin_IDs = array($origin_IDs, $IP); //save origin IDs for later use
```

```
//remove appended bundle request from string queue database
$query = "DELETE FROM BundleRequestTable WHERE mysql_field_name($result,1) = $string";
$result = mysql_query($query);
} // end for-loop
//provide batch registration request and obtain response from hosting server
$bundle = $hostserver->api_client->feed_registerTemplateBundle($batch_request);
} // end if-statement
mysql_close("StringQueue.SQL"); // close database access
?>
```

In some implementations, the hosting server may obtain bundle registration requests submitted (e.g., in a batch, as illustrated in the above example) by the developer system, and generate bundle IDs associated with each of the bundle registration requests in the submitted request batch. The hosting server may provide 419 the bundle IDs in the form of a data file, such as a JavaScript Object Notation ("JSON") data file, an eXtensible Markup Language ("XML") data file, and/or the like. An exemplary listing illustrating substantive aspects of providing bundle IDs for five bundle registration requests submitted in a batch to the hosting server by the developer system, written substantially in the form of XML, is provided below:

```
<?XML version = "1.0" encoding = "UTF-8"?>
<feed_registerTemplateBundle_response
xmlns = "http://api.hostserver.com/1.0/"
xmlns:xsi = "http://www.w3.org/2001/XMLSchema-instance"
xsi:schemaLocation = "http://api.hostserver.com/1.0/...">
<bundle>38275927430</bundle>
<bundle>57384860381</bundle>
<bundle>08372947672</bundle>
<bundle>58927852285</bundle>
<bundle>69384719475</bundle>
</feed_registerTemplateBundle_response>
```

In some implementations, the string registry server may obtain 420 the bundle IDs provided by the hosting server, and correlate 421 the obtained bundle IDs to the original requests submitted to the string queue database. For example, the string registry server may parse an XML data file, e.g., such as illustrated in the example above, to obtain the bundle IDs provided by the hosting server in an array. The string registry server may correlate the bundle IDs obtained from the hosting server to the input strings stored in the submitted batch request to determine the correspondence between the bundle IDs and the input strings. Based on the correlation, the string registry server may update 422 the bundle database with the bundle IDs obtained from the hosting server, and, if not performed earlier, remove the bundle requests that have been processed by the hosting server from the string queue database. An example listing illustrating substantive aspects of the registry server and/or databases, written substantially in the form of PHP/SQL commands and generally compatible with the XML data in the example above, is provided below:

```
<?PHP
//parse $bundle storing XML data from hosting server to obtain bundle IDs
//stored in $bundle_ID
$start = "<bundle>";
$end = "</bundle>";
preg_match_all("/$start(.*)$end/Us", $bundle, $bundle_ID);
//create new records in the bundle database for each of the processed bundle
```

```
//requests in the submitted batch request, using the obtained bundle IDs
mysql_select_db("Bundle.SQL"); // select bundle database to create new bundles
for ($k = 1; $k <= $process; $k++) {
mysql_query("INSERT INTO APIBundleTable (bundle_id bundle_fields host_api_name input_string")
VALUES (bundle_ID[k], $bundle_fields, $api_name, $batch_request[k]); // add bundle request
} //end for-loop
mysql_close("Bundle.SQL"); // close database access
?>
```

In some implementations, the string registry server may notify 424 the developer server and/or workstation that originated the bundle request that the bundle request has been successfully been processed (e.g., by sending a message via HTTP(S) post, etc.), upon which 425 the developer server and/or workstation may query the bundle database for the newly created bundle. In alternate implementations, the developer server and/or workstation may periodically check for new bundles in the bundle database that may be required for code input into the developer server and/or affiliated workstation, without notification being provided by the string registry server. Upon obtaining 426 the new bundle ID for the newly created bundle in the bundle database, the developer server may obtain the code (e.g., from the code database), parse the code for API calls 427, identify the API calls to the hosting server for which bundle IDs are available (e.g., based on querying the bundle database based on the identified input strings to the hosting server API calls), and update/replace 428 the found hosting server API call input strings with the bundle IDs obtained from the bundle database. In some implementations, the developer server may update 429 the stored version of the code provided by the developer and/or workstation with the updated code including the bundle IDs replacing the hosting server API call input strings. In some implementations, the developer system may further develop/compile applications/modules using the updated code for providing multi-user social networking application services for the users/clients.

Figure 5A:
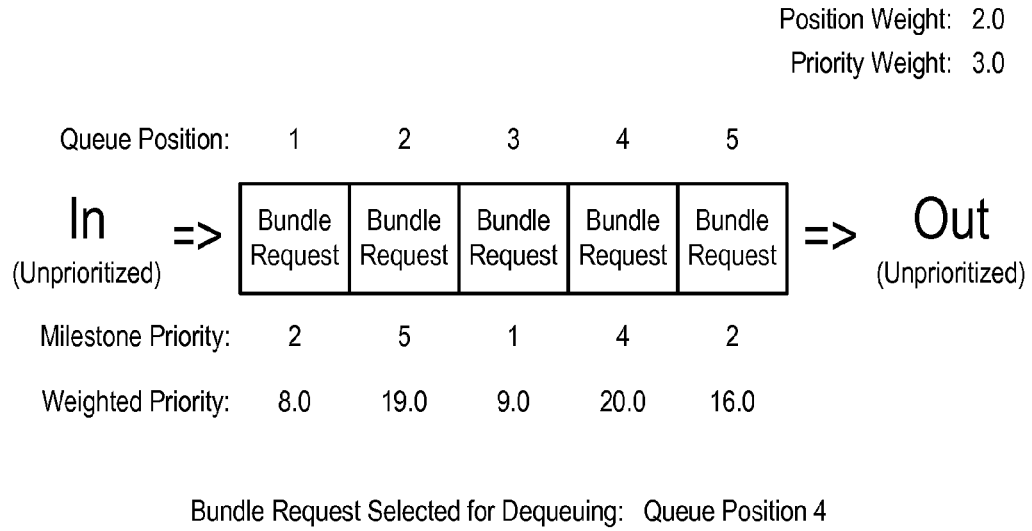
FIGS. 5A-B are of block diagrams illustrating aspects of API call abstraction request management in some embodiments of the SNAM.
Figure 5B:
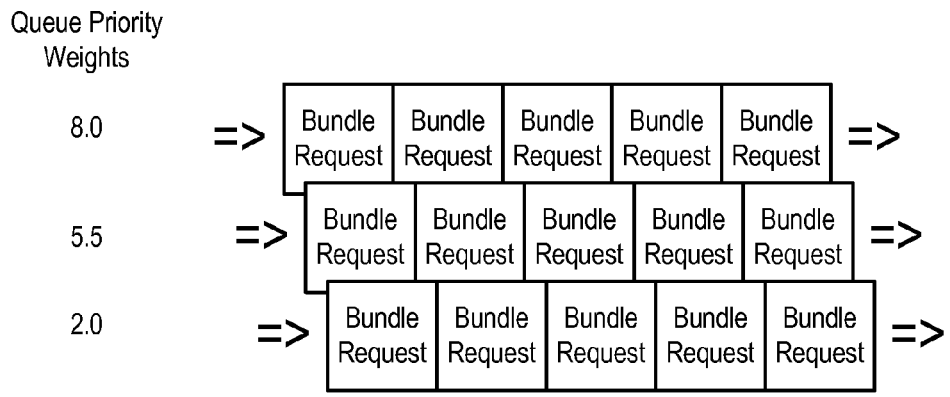

FIGS. 5A-B are of block diagrams illustrating aspects of API call abstraction request management in some embodiments of the SNAM. In some implementations, the string registry server may select the next bundle request to be processed according to a priority queuing process. In some implementations, the string registry server may determine the next bundle request to process based on the order (e.g., using a timestamp submitted with each bundle request) in which the bundle requests entered the string queue and a priority value assigned to each of the bundle requests (e.g., based on an originating IP address associated with each bundle request). Each bundle request in a string queue may be assigned a queue number indicative of the order in which the bundle requests entered the queue and a priority value indicative of the importance attached to processing the bundle request. In some implementations, the string registry server may determine the bundle request priority values based on a number of factors including, but not limited to, bundle ID, originator ID, and/or the like. In some implementations, the string registry server may assign relative importance to the order in which bundle requests entered the string queue and the priority value assigned to any particular bundle requests using position weights and/or priority weights. For example, a net priority value of a bundle request in a string queue may be determined by the string registry server as the weighted sum of the queue position and the bundle request priority, wherein the weights are the position weight and the priority weight, as illustrated in FIG. 5A:

Net Bundle Request Priority Value=Request Queue
Position*Position Weight+Request
Priority*Priority Weight;

In such implementations, the bundle request next selected for processing by the string registry server may be identified as the bundle request having the highest net bundle request priority value. In further implementations, the string registry server may utilize multiple queues for bundle requests, such as the non-limiting exemplary illustration in FIG. 5B. In some implementations, each string queue may be assigned a queue priority weight relative to the other string queues for bundle requests. In such implementations, the net priority value of a bundle request may be weighted by the weight assigned to its bundle request queue:

Net Bundle Request Priority Value=(Request Queue
Position*Position Weight+Request
Priority*Priority Weight)*Queue Priority Weight;

In some such implementations, the next bundle request selected by the string registry server for processing among the bundle requests in all the string queues may be the bundle request having the highest net bundle request priority value, including the weighting assigned to each of the queues in the string queue database.

Social Networking Application Updating

Figure 6:
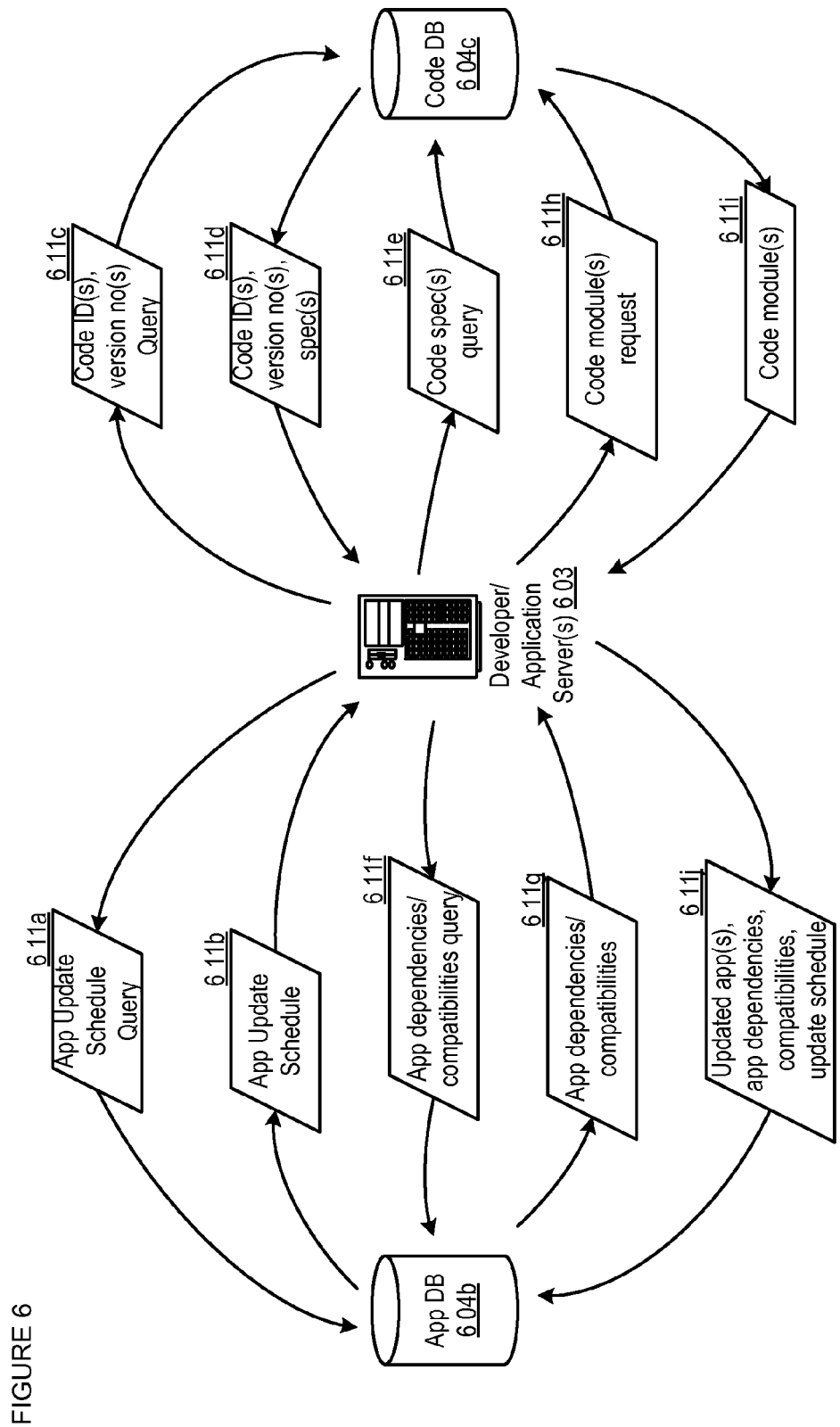
FIG. 6 is of a data flow diagram illustrating aspects of social networking application updating in some embodiments of the SNAM.
Figure 7C:
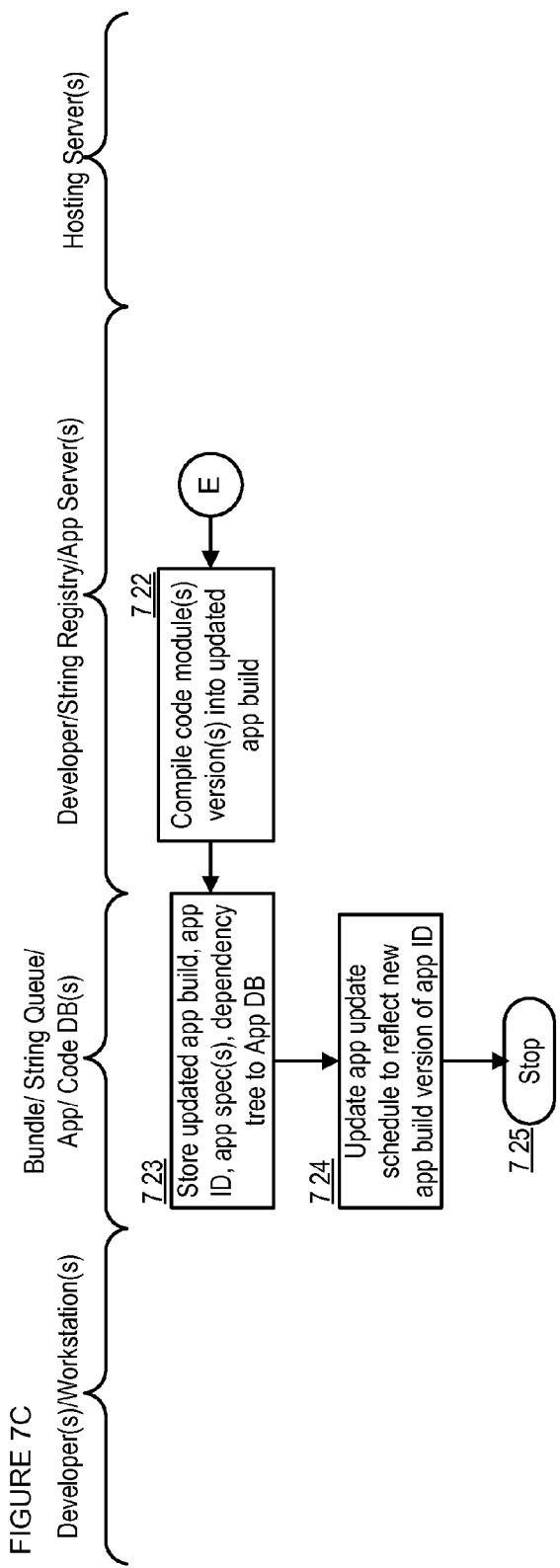

FIG. 6 is of a data flow diagram illustrating aspects of social networking application updating in some embodiments of the SNAM. In some implementations, the SNAM system may, at any time, generate, store, maintain and/or deploy a large number of code modules, code versions, application modules, application versions, module/application dependency graphs, application/module specifications, compatibility lists, and/or the like, to provide social networking application services to a broad user/client audience. In some implementations, the developers/workstations may provide various application/module code updates and/or submissions for the developer servers. In response, the developer system may analyze the provided code and accompanying specifications (e.g., parse the code, identify code dependencies/references, API calls and/or associated strings, determine client browser/hardware requirements), modify the code if needed (e.g., modify references to other code/application modules, register any new input strings of API calls included in the modified code module, etc.), and compile updated and/or new applications/modules for providing the social networking application services for the users of the hosting server/developer system.

Addition of new applications to the app database and/or updating of existing applications may be performed according to a variety of strategies, for example, as soon as all code modules available for compiling an updated application are available, according to a pre-determined planned schedule, on-demand by a developer, server and/or client within the SNAM, and/or the like. In some implementations, a developer and/or application server(s) ("server") may request 611a and obtain 611b an app update schedule from a database (e.g., the app database). The app update schedule may include information on an application available in the database including, but not limited to, an application ID, application name, application version, application version date, scheduled application update versions and times, developer project team details, and/or the like. An exemplary XML data listing including app update schedule information, such those listed above, is provided below:

```
<?XML version = "1.0" encoding = "UTF-8"?>
<app_specification>
<app_ID>A82DNC31</app_ID>
<app_name>poker_client_main</app_name>
<app_version>v12.3.6.3</app_version>
<app_version_timestamp>2010-04-01
21:33:47</app_version_timestamp>
<app_update_schedule>
<app_update_version>v12.3.6.4
<deadline>2010-05-15</deadline>
<priority>medium</priority>
</app_update_version>
<app_update_version>v12.3.6.5
<deadline>2010-07-01</deadline>
<priority>low</priority>
</app_update_version>
<app_update_version>v12.3.7.0
<deadline>2011-01-01</deadline>
<priority>high</priority>
</app_update_version>
</app_update_schedule>
<developer>
<project_manager>John Q. Public</project_manager>
<project_team>blore\007</project_team>
</developer>
</app_specification>
```

The server may parse the app update schedule, and determine that a specific application needs to be created and/or checked for updates based on the information available in the app update schedule. In alternate implementations, the server may obtain an indication from a client, developer and/or other entity within the SNAM to check for updates to an application and information on a currently deployed version of the application. In alternate implementations, the server may be triggered by an event (e.g., "75% of application code in the code database has been updated by the developer system," "a greater-than-threshold volume of update requests has been received" etc.) to check whether updates to an application can be made based on the information on the currently deployed application version and updated coded submitted by developers to the developer system.

In some implementations, upon determining that an application needs to be tested for updates, the server may generate and provide a query to the app database for specifications of the application (e.g., 611f) including, but not limited to, version information for the application, compatibility information for the application (e.g., compatible operating systems and version, compatible browsers, compatible hardware, etc.), application dependencies (e.g., module names/versions which are referenced, external resources/APIs called etc., drivers required), hardware and/or software requirements, and/or the like. The app database may respond to the query with such information (e.g., 611g) and/or may provide the actual application that is being checked for possible updating. In some implementations, the server may scan the application obtained from the app database and determine, based on scanning the application, such specifications for the application. An exemplary XML-encoded listing of application requirements/compatibilities is provided below:

```
<?XML version = "1.0" encoding = "UTF-8"?>
<app_specification>
<app_ID>A82DNC31</app_ID>
<app_name>poker_client_main</app_name>
<app_type>Application (exe)</app_type>
<app_version>v12.3.6.3</app_version>
<app_compile_type>ahead-of-runtime</app_compile_type>
<app_software_requirements>
<environment_type>MSWindows</environment_type>
<environment_version>XP 2003 7</environment_version>
</app_software_requirements>
<app_hardware_requirements>
<processor>Intel Pentium</processor>
<memory>
<ROM>1024MB</ROM><RAM>256MB</RAM>
</memory>
</app_hardware_requirements>
<dependency_graph>
<module>
<module_name>advapi32.dll</module_name>
<functions_called>RegSetValueEx RegClseKey</functions_called>
<dependency_graph>
<module>
<module_name>kernek32.dll</module_name>
<functions_called>A_SHAInit</functions_called>
</module>
</dependency graph>
</module>
</dependency_graph>
</app_specification>
```

Upon obtaining the specifications for the currently deployed application version, the server may generate a query (e.g., 611c) for, and obtain information (e.g., 611d) on, code IDs and code version numbers of code modules that are related (e.g., code for the application being tested for updating, code for a module/application referenced/redirected to/called in the application, etc.) to the application, based on the obtained specifications of the currently deployed application version. Upon obtaining the information on code IDs and code version numbers of code modules related to the application being checked for updates, the server may generate queries for specifications (e.g., 611e) of the code modules based on the code IDs and code version numbers. In some implementations, the specification information of the related code modules may be provided by the code database being queried, along with the code IDs and version numbers. The server may analyze the code IDs and code version numbers of the related code modules in view of the version number and the dependencies of the currently deployed version of the application. The server may determine whether an update to currently deployed version of the application may be performed based on whether sufficient updates are available among the code modules related to the currently deployed version of the application. Upon determining that sufficient updates to the related code modules are available such that an application update is possible, the server may determine the code module(s) and/or version number(s) of such code module(s) that are required in order to compile an updated version of the currently deployed version of the application. The server may generate and provide a code module query (e.g., 611h) for the related code module needed to compile the application update. Upon obtaining the code module query, the code database may provide the requested code module(s) (e.g., 611i) for the server. The server may, upon obtaining the required code modules, code specifications, application specifications, application dependencies etc., compile the updated version of the application based on the obtained information. The server may assign a new version number for the updated version of the application, and then provide (e.g., 611j) the updated version of the application, version information, specifications for the updated version of the application, application dependencies, etc. for storage to the app database.

FIGS. 7A-D are of logic flow diagrams illustrating aspects of social networking application updating in some embodiments of the SNAM. In some implementations, social networking application updating may commence upon obtaining an indication 702 to check whether updating an application is possible based on available updates to code stored in a code database. In some implementations, a user/client may send to the SNAM-affiliated server(s) a "check for updates" message to trigger social networking application updating. For example, a client device may send a HyperText Transfer Protocol ("HTTP") POST message requesting a check for updates to an application, and the server may initiate application update check on-demand. An exemplary listing illustrating substantive aspects of a HTTP POST message (e.g., sent by a web browser executing on a client computing system) sent to initiate a server-side application update checking PHP script is provided below:

```
POST /poker/clientupdater.php HTTP/1.1
Host: www.snam.com
User-Agent: Mozilla/4.0
Content-Type: application/xml; charset=UTF-8
Content-Length: 174
<?XML version = "1.0" encoding = "UTF-8"?>
<app_ID>A82DNC31</app_ID>
<app_name>poker_client_main</app_name>
<app_type>Flash Object</app_type>
<app_version>v12.3.6.3</app_version>
```

In other implementations, a server may periodically initiate automatically an application update check. In further implementations SNAM-affiliated entity activities and/or processes, changes to values for data variables stored in a database and/or other changes of state of the SNAM may trigger application update checking by a server. In some implementations, upon obtaining the indication to perform the application update check, the server may execute a PHP script including SQL commands to query the app database for an app update schedule. Upon obtaining the query, the database may provide an app update schedule as, for example, XML-encoded data. The server may parse the app update schedule from the app database to obtain app update schedule details for an application (e.g., the application for which an update check was requested by the user/client) (e.g., via grep, a string select procedure, SOAP parse method, query select command, and/or the like). The server may compare the version number provided by the client with the current version number included in the app update schedule. If the client-provided version number is older than the current version as indicated in the app update schedule, the server may provided an indication to the client that the client possesses an outdated version of the application, and may provide a link for the client to obtain the current version of the application. The server may also analyze the scheduled update plan as provided in the app update schedule. If the server determines that an update to the current version of the application may be possible based on analyzing the app update schedule, the server may continue with the application update checking. In some implementations, the server may query for, and obtain from the app database 703, the current version of the application using the application information from the app update schedule. The server may scan the obtained current version of the application to determine a dependency graph topology 704 for the current version of the application. For example, in the case of a 32-bit or 64-bit executable application/module (*.exe, *.dll, *.ocx, *.sys, etc. file types) for Microsoft Windows® operating systems, the server may utilize the Dependency Walker freeware utility (depends.exe) in a command-line, batch-processing mode to scan the executable, build a hierarchical tree diagram of modules the executable depends on to provide its features, generate a listing of procedures within those modules that are called by the executable ("dependent modules," which may include the top-most code module, i.e., the module at the top of the hierarchical tree diagram of modules and making the primary procedure calls), generate a listing of the minimum set of required files including detailed file information (e.g., name, typical file path, version number, machine type, debug information, etc.) 705, and provide the results of such dependency analysis of the executable as a text file for easy parsing by the server. Alternatively, under Macintosh OS X, querying via Spotlight for file system version number metadata may yield similar results. In alternate implementations, such information may previously be stored in a database in the SNAM (e.g., in the app database), and the server may query the database and obtain the stored information from the database.

In some implementations, the server may utilize the dependent module file information from the dependency graph topology to query the code database for internal code IDs 706 associated with dependent modules. The server may obtain the code IDs for the dependent modules from the code database 707, and may query the code database to obtain all version numbers 708 of code available for the code IDs corresponding to the dependent modules, for example, sorted by version number. Upon obtaining the versions numbers of the dependent code modules from the code database, the server may compare 709 the code versions of the dependent modules of the currently deployed application version to the most recent code versions numbers available for those dependent modules. If no new versions of dependent module code are available (e.g., 710, Option "No"), the server may determine that updates to the currently deployed version of the application module are not possible at the present time, discontinue application updating for the current application, and may choose another application module for which to initiate application update checking. If new versions of dependent module code are available (e.g., 710, Option "Yes"), the server may identify the dependent modules for which updated versions of code are available, and identify 711 the code version numbers for the available updated versions of code for the dependent modules. For example, in some implementations, the server may obtain all available code version numbers for a dependent module, sorted in descending order of version numbers. The server may then identify a record number of the code version corresponding to the currently deployed code version of the dependent module. In such an example, the records preceding this identified record number would be of more recently updated versions of the dependent module code than the currently deployed version. The server may extract the code IDs and code version numbers of the dependent module versions corresponding to these preceding record numbers.

In some implementations, the server may query 712 the code database for specifications of the current versions of dependent module code for which it was identified that newer versions of code are available, and for the newer versions of these identified dependent code modules. The code database may respond to the query by providing 713 the specifications data files for the requested dependent code module versions, which the server may parse 714 to extract the specifications of the dependent code module versions. The server may query 715 for, and obtain from the app database, the app update schedule including the proposed version numbers of the scheduled application update versions. The server may select 716 one of the proposed version numbers of the scheduled application update versions as being the update version number to which the server may attempt to update the currently deployed version of the application. As a non-limiting example of the selection methodology, the server may determine an amount of time remaining until a deadline for updating the current version of the application to each proposed version number, and may determine a numeric relative priority level for each proposed application update version number. The server may calculate a ratio of the time remaining until the deadline for updating the current version of the application to each proposed version number, to the priority level for that proposed application update version number. The server may then select the scheduled application update version having the lowest such associated ratio as being the application update version to which updating of the currently deployed application version may be attempted. Upon selecting a scheduled application update version for attempting updating of the currently deployed version of the application to, the server may query 717 the app database for proposed specifications for the selected scheduled updated version of the application. The app database may provide the proposed specifications for the scheduled updated version of the application as a data file, which the server may parse to extract the proposed specifications information for the updated application version.

In some implementations, the server may utilize an iterative process 718-720 to select the dependent code module versions using which to attempt updating the currently deployed version of the application. The server may identify 718 an initial set of dependent module code versions that could be compatible with the updated version of the application. The server may attempt to update the application using this initial set of dependent code modules. In some implementations, the server may select (e.g., 726) the most recent versions for all dependent code modules as the initial set of dependent code modules. The server may obtain the specifications (e.g., 727) of the versions of the dependent code modules in the selected set, and compare attributes of each of the dependent code module versions in the selected set with those of like attributes of the selected scheduled application update version to determine whether the dependent code module set is fully compatible with the updated application module. Following is a non-limiting, example dependent module selection strategy that may be used in some implementations of the SNAM. For each dependent code module version in the selected set, the server may obtain specification attributes (e.g., from the code database). The server may compare (e.g., 728) the specification attributes of the dependent code module version included in the dependent code module set against the specification attributes of the updated application module. Based on the specification attributes comparison, the server may determine, for each dependent code module version, a number of specification attributes that are incompatible with the corresponding specification attributes of the updated application module (e.g., 729). For example, the server may determine a number of attributes of each dependent code module for which the attribute values differ from the like attribute values of the selected scheduled application update version. The server may check whether all dependent code module versions are fully compatible (e.g., 730) with the updated application module by analyzing the number of incompatible specification attributes for each of the dependent code module versions. If at least one dependent code module version has non-zero incompatible specification attributes (e.g., 730, Option 'No'), the server may identify, based on the above computations, a least compatible dependent code module (e.g., 731) as that module having the greatest number of incompatible specifications attributes (e.g., attributes with values differing from those of like attributes of the selected scheduled application update version). If a least compatible dependent code module can be identified having at least one incompatible attribute, the server may determine that the currently selected set of code module versions may not be used to perform application updating (e.g., 720, Option No). In such an instance, the server may modify the set of dependent module code versions by selecting a different version number for the least compatible dependent code module. For example, the server may identify a current version number for the least compatible code module version (e.g., 732), and select for a new dependent module code set the next most recent version (e.g., 733) of the dependent code module version identified as being least compatible, while maintaining the same code module version numbers for the other dependent code modules in the set. The attributes of the specifications of the modified dependent code module version set may again be compared against those of the selected scheduled application update version to identify any least compatible dependent code module versions. Such a comparison and dependent code module version modification strategy may be iteratively executed until the server determines that all dependent code module versions in the set are fully compatible with the selected scheduled application update version (e.g., 720, Option 'Yes', 730, Option 'Yes'). The server may identify (e.g., 721, 735) the dependent code module version numbers of the dependent code modules in this fully compatible dependent code module set and query for, and obtain from the code database, such dependent module code versions. The server may then compile 722 the selected updated application version, using the dependent code module set identified as being fully compatible with the updated application module. As a non-limiting example, for compiling Adobe Flash® (*.flv, *.swf, etc. file types) object code authored using Adobe® ActionScript scripting language, the server may utilize the Adobe® Flex freeware open-source development framework designed for building cross-platform rich Internet applications. In some implementations, pre-runtime (ahead-of-time) compilation may not be required, for example, for applications using interpreted compilation and/or just-in-time (JIT) compilation. The server may then generate an updated app update schedule and specifications for the developed application update, store the updated application and/or code 723, application version number, application specifications 724, etc., in the app and/or code databases to complete application updating.

Figure 8:
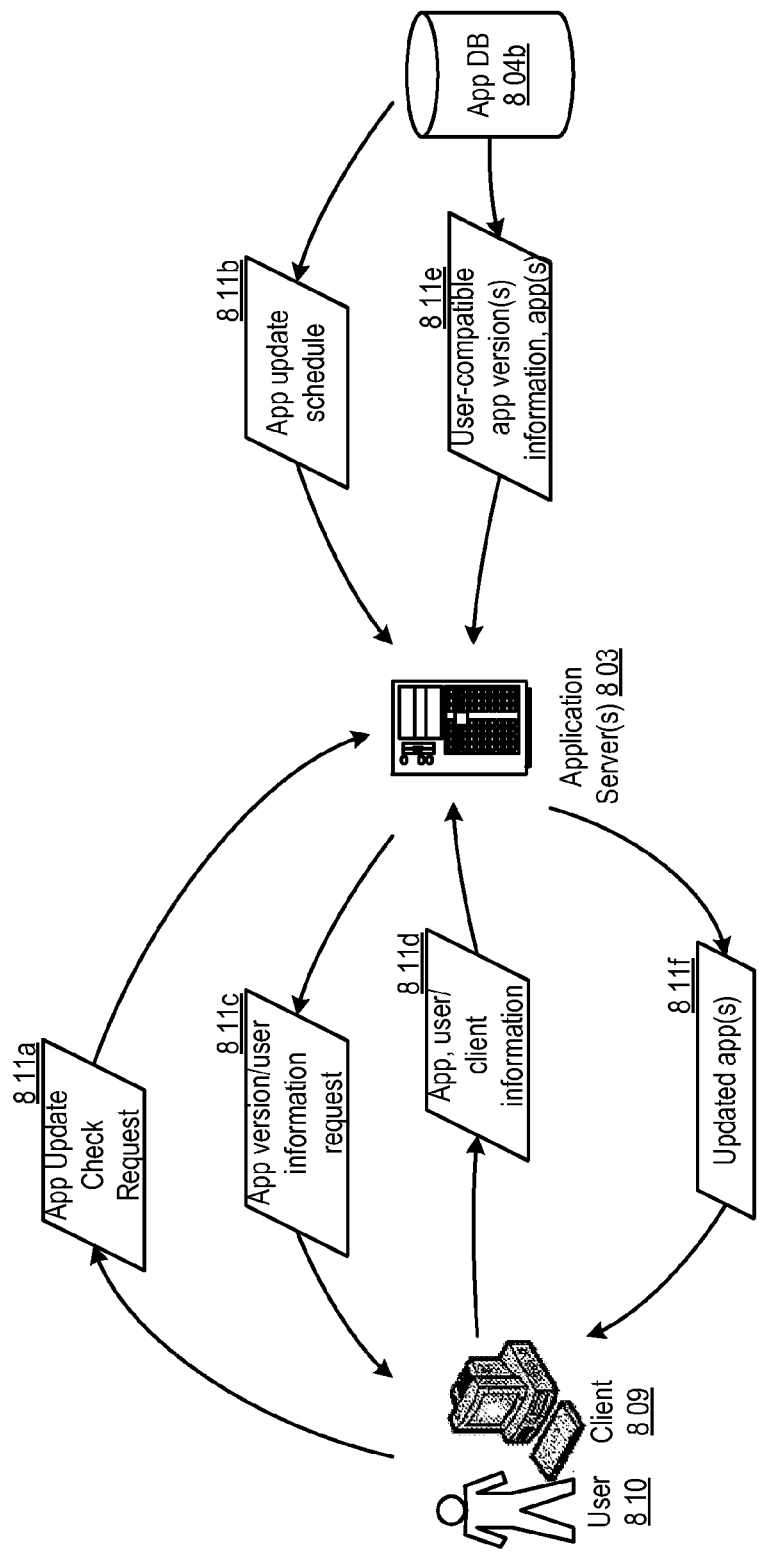
FIG. 8 is of a data flow diagram illustrating aspects of social networking application update deployment in some embodiments of the SNAM.

FIG. 8 is of a data flow diagram illustrating aspects of social networking application update deployment in some embodiments of the SNAM. In some implementations of the SNAM, a user/client may send to the SNAM-affiliated server(s) a "check for updates" message 811a to trigger social networking application updating. For example, the client may provide a HTTP(S) POST message similar to the example provided below in the discussion with reference to FIGS. 9A-C including application version information, which may trigger the social networking application updating. In other implementations, a server may periodically initiate automatically an application update check. In further implementations SNAM-affiliated entity activities and/or processes, changes to values for data variables stored in a database and/or other changes of state of the SNAM may trigger application update checking by a server. In some implementations, the server may query for, and obtain from the app database, the app update schedule 811b. The server may parse the app update schedule, determine application version numbers that exists in the app database, and obtain application specifications for each application version. The server may also request 811c application version details for the application currently deployed to the user, along with information on the user and/or client's computing environment. The user and/or client may respond with the requested information 811d. The server may compare the user and/or client information with the specification information of the application versions stored in the database to determine whether an application version exists that represents an update to the version currently deployed to the user and/or client, and is compatible with the hardware, software and/or user requirements as provided by the user and/or client. If such an update exists, the server may query for, and obtain 811e from the app database, the user/client-compatible updated application version, and coordinate 811f updating of the client application using the obtained application.

FIGS. 9A-C are of logic flow diagrams illustrating aspects of social networking application update deployment in some embodiments of the SNAM. In some implementations, a user may be using an outdated version of an application executing on a client terminal. The client application may be communicating with a script executing on a server within the SNAM. In some implementations, the client application may provide an indication of the application version of the application executing on the client terminal. For example, the client may be executing an Asynchronous JavaScript and XML ("AJAX"), which may provide a HTTP(S) POST message including such details as the application ID, application name, application version, application version timestamp, and/or the like, in the message body of the HTTP POST message as JSON-encoded data. An exemplary program listing illustrating substantive aspects of providing a HTTP POST message including the indication of the application version to the server as JSON-encoded data, written substantially in the form of AJAX commands, is provided below:

```
<script type = "text/javascript" src="http://www.json.org/json.js">
</script>
<script type = "text/javascript">
var dataJSON = { "client_app" {
"app_ID": "AC62D728",
"app_name": "client_poker_main.js",
"app_version": "v12.3.6.1",
"app_version_timestamp": "2010-04-01 09:23:43"}
}
var strJSON = encodeURIComponent(JSON.stringify(dataJSON));
var client = new XMLHttpRequest( );
client.open("POST", "appupdatecheck.php?inputText=" + strJSON);
client.setRequestHeader("Host", "www.snam.com");
client.setRequestHeader("Content-Type", "application/json; charset = UTF-8");
client.setRequestHeader("Content-Length", "140");
client.send( );
</script>
```

In some implementations, the server may execute a PHP script, which may parse the JSON-encoded data in the provided POST message into a PHP variable using the JSON_decode( ) procedure, and extract the provided application version details. An exemplary program listing illustrating substantive aspects of obtaining the POST message with the JSON-encoded data and converting it into a PHP variable, written substantially in the form of PHP commands, is provided below:

```
<?PHP
// if inputText is provided (e.g., via HTTP POST to PHP script), obtain
data
if(isset($_GET['inputText'])) {
$json_string = $_GET['inputText']);
$json_data = json_decode($json_string); }
?>
```

Upon obtaining the application version data from the client, the server may compare the version timestamp of the application version used by the client to the current time. If the difference in time between the timestamp and the current time is greater than a specified threshold, the server may determine 903 that updated application deployment may be required for the user and/or client. The server may generate and provide a query 904 (e.g., a HTTP POST message) for all applications and associated application version numbers being used by the client. The client-side application may obtain the request, and provide 905 to the server the requested information on applications and version numbers being used by the client. Upon obtaining the application information from the client, the server may use the obtained application information to generate and provide to the app database queries 906 for app update schedules for the applications being used by the client. The app database may provide 907 the requested app update schedules for the server. In some implementations, an app update schedule may include version numbers and version created/scheduled dates for various prior, current and future versions of the application. An exemplary XML data listing illustrating substantive aspects of application version information included in an app update schedule is provided below:

```
<?XML version = "1.0" encoding = "UTF-8"?>
<app_ID>A82DNC31</app_ID>
<app_name>poker_client_main</app_name>
<app_type>Application (exe)</app_type>
<app_current_version>v12.3.6.3</app_current_version>
<current_version_timestamp>2010-03-24 16:43:19-
</current_version_timestamp>
<prior_versions>
<version>v12.3.6.2<timestamp>2010-01-03
15:23:03</timestamp></version>
<version>v12.3.6.1b<timestamp>2009-11-07
07:28:57</timestamp></version>
<version>v12.3.6.1a<timestamp>2009-08-16
16:22:23</timestamp></version>
<version>v12.3.6.0c<timestamp>2008-04-21
16:33:09</timestamp></version>
</prior_versions>
<scheduled_versions>
<version>v12.3.7.2<scheduled>2011-02-01</scheduled></version>
<version>v12.3.7.1<scheduled>2010-10-07</scheduled></version>
<version>v12.3.7.0<scheduled>2010-03-16</scheduled></version>
<version>v12.3.6.3<scheduled>2010-01-21</scheduled></version>
</scheduled_versions>
```

The server may compare the application information obtained from the client with the version information included in the app update schedule. Based on the comparison, the server may determine that the client application is outdated, and that a user application update may be performed (908, Option "Yes"). Upon determining that the client application may be updated, the server may generate a request 909 for user/client information including, but not limited to, operating system name, operating system version, operating system service pack, memory capability, processor name, processor instruction set, web browser name, web browser version, network connection type, network connection bandwidth, and/or the like. The user and/or client may obtain the request for user/client information, and provide the requested user/client information 910 for the server, e.g., as a JSON-encoded data file via a HTTP(S) POST message. The server may obtain the information from the user/client, and may parse the obtained data file to extract a list of user/client compatibilities. The server may generate 913 one or more queries, based on the user/client compatibilities, and provide the queries for the app database to obtain application version number of the application that have specifications that are compatible with the user/client compatibilities. Upon obtaining the queries, the app database may provide 914 version numbers of application versions that are compatible with the user/client compatibilities, and their associated timestamps. The server may analyze the timestamps to determine 915 whether a more recent version than the version being used by the user/client is available. If a more recent compatible application version is available (e.g., 916, Option "Yes"), the server may query 916 the app database for the most recent compatible version of the application and obtain the most recent compatible version of the application from the app database. In some implementations, the server may obtain a number of such compatible updated applications for a plurality of applications being utilized by the user/client.

In some implementations, upon obtaining the updated application versions, the server may provide a notification 917 to the user/client that an updated application version is available for an application being used by the user/client. The server may also provide a list of applications/processes that will be provided if the update is accepted by the client. The client, upon obtaining the notification 918, may determine whether any of the applications/processes listed by the server in its notification message are alive 919. If any applications/processes for which the server has indicated that updated versions are available are alive (e.g., 919, Option "Yes"), the client may determine whether the states of such applications/processes are stored in a non-volatile memory 921; e.g., on the server (e.g., in a user profile for that app, etc.), on the client (e.g., in a cookie, etc.), and/or the like. If the states of the applications/processes are not stored in a non-volatile memory (e.g., 921, Option No), the client may store 922 the states of the applications/processes (e.g., a data structure comprising all data pertaining to the applications/processes) to a non-volatile memory (e.g., hard disk, flash memory card, etc.). The client may also store information on which applications were live at a time just prior to saving the state of the applications/processes in the non-volatile memory. The client may then kill/delete 923 any applications/processes that are part of the application update provided by the server, and any applications/processes on which the to-be-updated applications are dependent. Once the required applications/processes are killed/deleted, the client may provide a request for a new version of the application. For example, the client may request initiation of an FTP(S) session with the server to download 924 the application update. An exemplary program listing written substantially in the form of FTP(S) commands and illustrating substantive aspects of creating a FTP(S) session, downloading application files onto the client, and closing the FTP(S) session is provided below:

```
ftps userID:password@apps.SNAM.com
get ClientUpdate1.tar.gz
close
```

Once the client obtains the application files provided by the server, the client may, if needed, unpack the downloaded application files, overwrite 924 the old prior version of the application with the downloaded updated version of the application. The client may also perform any required installation, including modification of keys in a registry of the client, addition/modification of application shortcuts, inclusion of dependent modules in appropriate file paths, and/or the like. In some implementations, the client may, upon completion of overwrite, installation and/or settings customization procedures, may access the memory location in the non-volatile memory to determine which application was running prior to the client killing/deleting processes. The client may restart such applications/processes stored in the non-volatile memory location 925, and if needed, pass a parameter for it to load any previously stored states. As such, the client may also obtain the stored previous state (as indicated by parameter, looking in a predefined location, obtaining it from the user's profile, etc.) of the applications/processes from the non-volatile memory location, and load the previously stored state 926 into the newly updated and currently executing applications/processes. The client may provide a notification to the server that the application has been successfully updated. The server, in response to obtaining such notification, may check if more application updates are available for the server to provide for the client. If additional application updates are available, the server may repeat the application updating sequence (e.g., 917-926) iteratively until the server determines that no further application updates are available for providing for the client, and may quit application update processing (e.g., 928).

SNAM Controller

Figure 10:
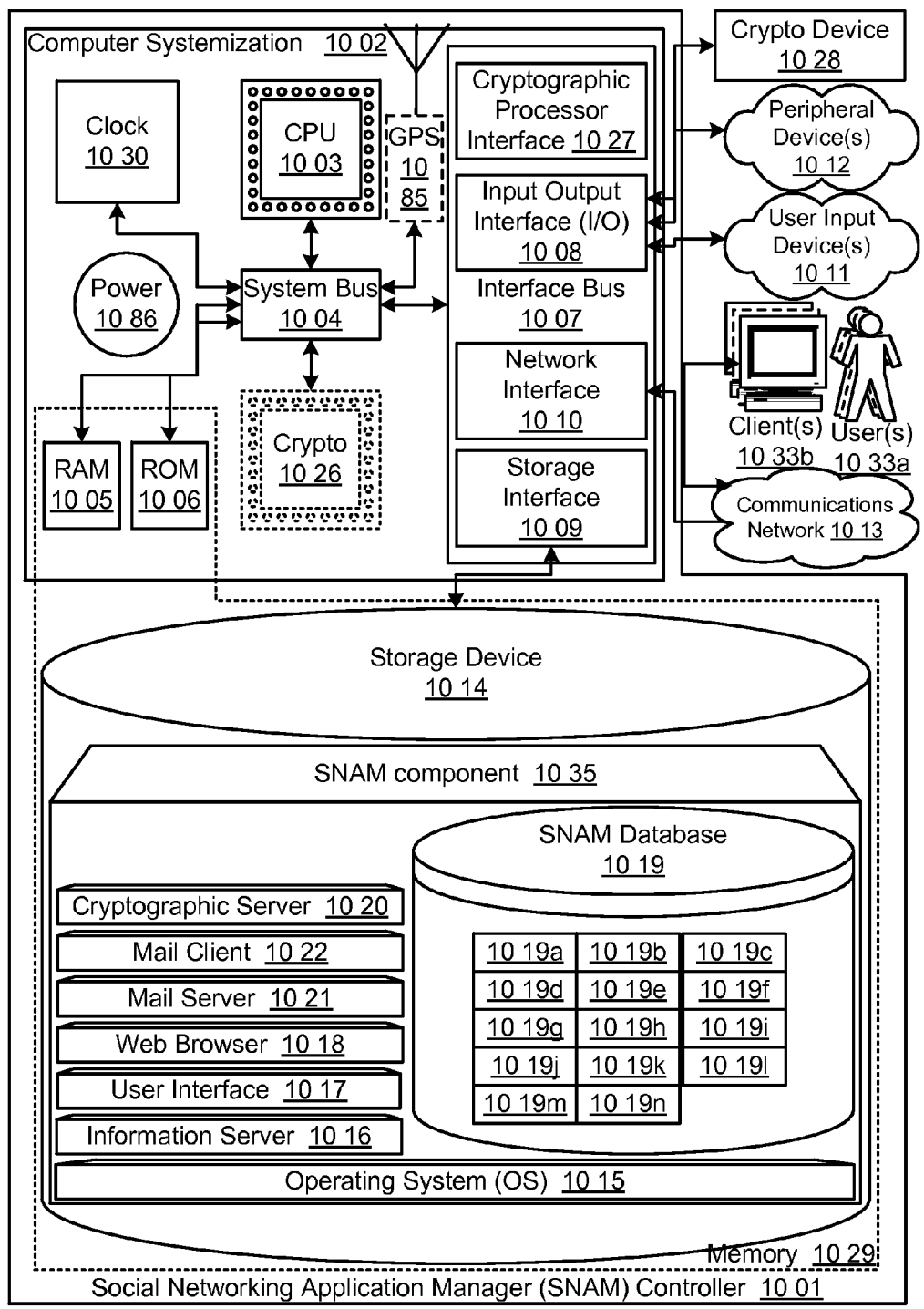
FIG. 10 is of a block diagram illustrating embodiments of the SNAM controller.

FIG. 10 illustrates inventive aspects of a SNAM controller 1001 in a block diagram. In this embodiment, the SNAM controller 1001 may serve to aggregate, process, store, search, serve, identify, instruct, generate, match, and/or facilitate interactions with a computer through enterprise and human resource management technologies, and/or other related data.

Typically, users, which may be people and/or other systems, may engage information technology systems (e.g., computers) to facilitate information processing. In turn, computers employ processors to process information; such processors 1003 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 1029 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the SNAM controller 1001 may be connected to and/or communicate with entities such as, but not limited to: one or more users from user input devices 1011; peripheral devices 1012; an optional cryptographic processor device 1028; and/or a communications network 1013. For example, the SNAM controller 801 may be connected to and/or communicate with users operating communication instrument(s) including, but not limited to, personal computer(s), server(s) and/or various mobile device(s) including, but not limited to, cellular telephone(s), smartphone(s) (e.g., iPhone®, Blackberry®, Android OS-based phones etc.), tablet computer(s) (e.g., Apple iPad™, HP Slate™ etc.), eBook reader(s) (e.g., Amazon Kindle™ etc.), laptop computer(s), notebook(s), netbook(s), gaming console(s) (e.g., Nintendo®DS etc.), portable scanner(s) and/or the like.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The SNAM controller 1001 may be based on computer systems that may comprise, but are not limited to, components such as: a computer systemization 1002 connected to memory 1029.

Computer Systemization

A computer systemization 1002 may comprise a clock 1030, central processing unit ("CPU(s)" and/or "processor(s)" (these terms are used interchangeable throughout the disclosure unless noted to the contrary)) 1003, a memory 1029 (e.g., a read only memory (ROM) 1006, a random access memory (RAM) 1005, etc.), and/or an interface bus 1007, and most frequently, although not necessarily, are all interconnected and/or communicating through a system bus 1004 on one or more (mother)board(s) 1002 having conductive and/or otherwise transportive circuit pathways through which instructions (e.g., binary encoded signals) may travel to effect communications, operations, storage, etc.

Optionally, the computer systemization may be connected to an internal power source 1086. Optionally, a cryptographic processor 1026 may be connected to the system bus. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 529 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the SNAM controller and beyond through various interfaces. Should processing requirements dictate a greater amount speed and/or capacity, distributed processors (e.g., Distributed SNAM), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the SNAM may be achieved by implementing a microcontroller such as CAST's R8051XC2 microcontroller; Intel's MCS 51 (i.e., 8051 microcontroller); and/or the like. Also, to implement certain features of the SNAM, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the SNAM component collection (distributed or otherwise) and/or features may be implemented via the microprocessor and/or via embedded components; e.g., via ASIC, coprocessor, DSP, FPGA, and/or the like. Alternately, some implementations of the SNAM may be implemented with embedded components that are configured and used to achieve a variety of features or signal processing.

Depending on the particular implementation, the embedded components may include software solutions, hardware solutions, and/or some combination of both hardware/software solutions. For example, SNAM features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the SNAM features. A hierarchy of programmable interconnects allow logic blocks to be interconnected as needed by the SNAM system designer/administrator, somewhat like a one-chip programmable breadboard. An FPGA's logic blocks can be programmed to perform the function of basic logic gates such as AND, and XOR, or more complex combinational functions such as decoders or simple mathematical functions. In most FPGAs, the logic blocks also include memory elements, which may be simple flip-flops or more complete blocks of memory. In some circumstances, the SNAM may be developed on regular FPGAs and then migrated into a fixed version that more resembles ASIC implementations. Alternate or coordinating implementations may migrate SNAM controller features to a final ASIC instead of or in addition to FPGAs. Depending on the implementation all of the aforementioned embedded components and microprocessors may be considered the "CPU" and/or "processor" for the SNAM.

Power Source

The power source 1086 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 1086 is connected to at least one of the interconnected subsequent components of the SNAM thereby providing an electric current to all subsequent components. In one example, the power source 1086 is connected to the system bus component 1004. In an alternative embodiment, an outside power source 1086 is provided through a connection across the I/O 1008 interface. For example, a USB and/or IEEE 1394 connection carries both data and power across the connection and is therefore a suitable source of power.

Interface Adapters

Interface bus(es) 1007 may accept, connect, and/or communicate to a number of interface adapters, conventionally although not necessarily in the form of adapter cards, such as but not limited to: input output interfaces (I/O) 1008, storage interfaces 1009, network interfaces 1010, and/or the like. Optionally, cryptographic processor interfaces 1027 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 1009 may accept, communicate, and/or connect to a number of storage devices such as, but not limited to: storage devices 1014, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 1010 may accept, communicate, and/or connect to a communications network 1013. Through a communications network 1013, the SNAM controller is accessible through remote clients 1033*b* (e.g., computers with web browsers) by users 1033*a*. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed SNAM), architectures may similarly be employed to pool, load balance, and/or otherwise increase the communicative bandwidth required by the SNAM controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 1010 may be used to engage with various communications network types 1013. For example, multiple network interfaces may be employed to allow for the communication over broadcast, multicast, and/or unicast networks.

Input Output interfaces (I/O) 1008 may accept, communicate, and/or connect to user input devices 1011, peripheral devices 1012, cryptographic processor devices 1028, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless: 802.11a/b/g/n/x, Bluetooth, code division multiple access (CDMA), global system for mobile communications (GSM), WiMax, etc.; and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 1011 may be card readers, dongles, finger print readers, gloves, graphics tablets, joysticks, keyboards, mouse (mice), remote controls, retina readers, trackballs, trackpads, and/or the like.

Peripheral devices 1012 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the SNAM controller may be embodied as an embedded, dedicated, and/or monitor-less (i.e., headless) device, wherein access would be provided over a network interface connection.

Cryptographic units such as, but not limited to, microcontrollers, processors 1026, interfaces 1027, and/or devices 1028 may be attached, and/or communicate with the SNAM controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Equivalent microcontrollers and/or processors may also be used. Other commercially available specialized cryptographic processors include: the Broadcom's CryptoNetX and other Security Processors; nCipher's nShield, SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+ MB/s of cryptographic instructions; VLSI Technology's 33 MHz 6868; and/or the like.

Memory

Generally, any mechanization and/or embodiment allowing a processor to affect the storage and/or retrieval of information is regarded as memory 1029. However, memory is a fungible technology and resource, thus, any number of memory embodiments may be employed in lieu of or in concert with one another. It is to be understood that the SNAM controller and/or a computer systemization may employ various forms of memory 1029. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory 1029 will include ROM 1006, RAM 1005, and a storage device 1014. A storage device 1014 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 1029 may contain a collection of program and/or database components and/or data such as, but not limited to: operating system component(s) 1015 (operating system); information server component(s) 1016 (information server); user interface component(s) 1017 (user interface); Web browser component(s) 1018 (Web browser); database(s) 1019; mail server component(s) 1021; mail client component(s) 1022; cryptographic server component(s) 1020 (cryptographic server); the SNAM component(s) 1035; and/or the like (i.e., collectively a component collection). These components may be stored and accessed from the storage devices and/or from storage devices accessible through an interface bus. Although non-conventional program components such as those in the component collection, typically, are stored in a local storage device 1014, they may also be loaded and/or stored in memory such as: peripheral devices, RAM, remote storage facilities through a communications network, ROM, various forms of memory, and/or the like.

Operating System

The operating system component 1015 is an executable program component facilitating the operation of the 10controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the SNAM controller to communicate with other entities through a communications network 1013. Various communication protocols may be used by the SNAM controller as a subcarrier transport mechanism for interaction, such as, but not limited to: multicast, TCP/IP, UDP, unicast, and/or the like.

Information Server

An information server component 1016 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the SNAM controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the SNAM database 1019, operating systems, other program components, user interfaces, Web browsers, and/or the like.

Access to the SNAM database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the SNAM. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the SNAM as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 1017 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 1018 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the SNAM enabled nodes. The combined application may be nugatory on systems employing standard Web browsers.

Mail Server

A mail server component 1021 is a stored program component that is executed by a CPU 1003. The mail server may be a conventional Internet mail server such as, but not limited to sendmail, Microsoft Exchange, and/or the like. The mail server may allow for the execution of program components through facilities such as ASP, ActiveX, (ANSI) (Objective−) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the SNAM.

Access to the SNAM mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 1022 is a stored program component that is executed by a CPU 1003. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 1020 is a stored program component that is executed by a CPU 1003, cryptographic processor 1026, cryptographic processor interface 1027, cryptographic processor device 1028, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the SNAM may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the SNAM component to engage in secure transactions if so desired. The cryptographic component facilitates the secure accessing of resources on the SNAM and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The SNAM Database

The SNAM database component 1019 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the SNAM database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the SNAM database is implemented as a data-structure, the use of the SNAM database 1019 may be integrated into another component such as the SNAM component 1035. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 1019 includes several tables 1019*a-h*. A UserProfiles table 1019*a* may include fields such as, but not limited to: user_ID, ssn, first_name, last_name, middle_name, suffix, prefix, address_first_line, address_second_line, city, state, zipcode, country, birth_date, gender, device_ID_list, device_name_list, device_type_list, hardware_configuration_list, software_apps_list, device_IP_list, device_MAC_list, device_preferences_list, and/or the like. A Developers table 1019*b* may include fields such as, but not limited to: developer_ID, developer_name, developer_status, developer_team, developer_manager_list, developer_projects_list, developer_schedule, and/or the like. An Apps table 1019*c* may include fields such as, but not limited to: app_ID, app_name, app_type, app_version, app_version_timestamp, app_prior_versions_list, app_prior_versions_timestamps, app_update_schedule, app_ scheduled_versions_list, app_scheduled_versions_dates, app_scheduled_versions_priority, app_enviroment_type, app_envrionment_version, app_compatibilities_hw, app_compatibilities_sw, app_dependent_topology_tree, app_depend_module_list, app_depend_function_list, app_depend_apps_list, and/or the like. A Code table 1019*d* may include fields such as, but not limited to: code_ID, code_name, code_type, code_version, code_version_timestamp, code_prior_versionslist, code_prior_versions_timestamps, code_update_schedule, code_scheduled_versions_list, code_ scheduled_versions_dates, code_scheduled_versions_ priority, code_enviroment_type, code_environment_version, code_compatibilities_hw, code_compatibilities_sw, code_ dependent_topology_tree, code_depend_module_list, code_depend_function_list, code_depend_codes_list, and/or the like. A Bundles table 1019*e* may include fields such as, but not limited to: bundle_ID, bundle_fields, bundle_string, bundle_host_api, bundle_register_timestamp, calling_module_ID_list, and/or the like. A Queues table 1019f may include fields such as, but not limited to: bundle_request_ID, bundle_request_fields, bundle_request_string, bundle_request_origin, calling_module_ID, bundle_request_timestamp, bundle_request_priority, bundle_request_queue_ID, bundle_register_attempts, bundle_host_api_name, and/or the like. A Trees table 1019g may include fields such as, but not limited to: code_ID_list, code_tree_position, code_tree_pointer_list, code_dependent_topology_tree, code_depend_module_list, code_depend_function_list, code_depend_codes_list, and/or the like. A Schedules table 1019h may include fields such as, but not limited to: app_update_schedule, app_scheduled_versions_list, app_scheduled_versions_dates, app_scheduled_versions_priority, and/or the like. A String Server table 19i may include fields such as, but not limited to: string_servers_list, string_servers_id, service_area_list, and/or the like. A Host Server 19j may include fields such as, but not limited to: api_id, api_name, permissionslist, user_id, user_name, developer_id, developer_auth_md5, and/or the like. A Developer Server table 19k may include fields such as, but not limited to: developer_id, developer_name, developer_project, team_leader, project_manager_id, and/or the like. A Workstation table 19l may include fields such as, but not limited to: programmer_id, programmer_name, programmer_projects, programmer_schedule, and/or the like. A Client table, 19m, may include fields such as, but not limited to: user_id, user_name, client_id, client_type, language_pref, client_hardware_compatibilities, client_software_installations, and/or the like. A String table 19n may include fields such as, but not limited to: input_string, bundle_id, bundle_type, and/or the like. One or more of the tables discussed above may support and/or track multiple entity accounts on a SNAM.

In one embodiment, the SNAM database may interact with other database systems. For example, employing a distributed database system, queries and data access by search SNAM component may treat the combination of the SNAM database, an integrated data security layer database as a single database entity.

In one embodiment, user programs may contain various user interface primitives, which may serve to update the SNAM. Also, various accounts may require custom database tables depending upon the environments and the types of clients the SNAM may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 1019a-n. The SNAM may be configured to keep track of various settings, inputs, and parameters via database controllers.

The SNAM database may communicate to and/or with other components in a component collection, including itself, and/or facilities of the like. Most frequently, the SNAM database communicates with the SNAM component, other program components, and/or the like. The database may contain, retain, and provide information regarding other nodes and data.

The SNAMs

The SNAM component 1035 is a stored program component that is executed by a CPU. In one embodiment, the SNAM component incorporates any and/or all combinations of the aspects of the SNAM that was discussed in the previous figures. As such, the SNAM affects accessing, obtaining and the provision of information, services, transactions, and/or the like across various communications networks. The SNAM component enables live reconciliation of code updates to multi-user social networking applications in highly dynamic build environments, through various APIs and/or the like and use of the features and abilities of the SNAM. In one embodiment, the SNAM component 1035 takes inputs (e.g., developer code updates (e.g., 311a), application/code specifications (e.g., 404), user app requests (e.g., 229)) etc., and transforms the inputs via various components (e.g., the bundle request submission component 400a, bundle registration request component 400b, code module updating component 400c, bundle request management component 500, module version check component 700a, module update component 700b, dependent module selection component 700d, application update deployment component 900, and/or the like), into outputs (e.g., app modules 228, bundle requests 311d, bundle register requests 311e, bundle IDs 311f, registered bundle entries 311g, updated code 311h, updated apps, app dependencies, compatibilities, schedules, etc., 611j), as shown in FIGS. 2-9C, as well as throughout the specification.

The SNAM component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the SNAM server employs a cryptographic server to encrypt and decrypt communications. The SNAM component may communicate to and/or with other components in a component collection, including itself, and/or facilities of the like. Most frequently, the SNAM component communicates with the SNAM database, operating systems, other program components, and/or the like. The SNAM may contain, communicate, generate, obtain, and/or provide program component, system, user, and/or data communications, requests, and/or responses.

Distributed SNAMs

The structure and/or operation of any of the SNAM node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques. For example, SNAM server(s) and database(s) may all be localized within a single computing terminal. As another example, the SNAM components may be localized within one or more entities (e.g., hospitals, pharmaceutical companies etc.) involved in coordinated patient management.

The configuration of the SNAM controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), local and remote application program interfaces Jini, Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between components. For example, a grammar may be arranged to recognize the tokens of an HTTP post command, e.g.: w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or other wise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., the SOAP parser) that may be employed to parse communications data. Further, the parsing grammar may be used beyond message parsing, but may also be used to parse: databases, data collections, data stores, structured data, and/or the like. Again, the desired configuration will depend upon the context, environment, and requirements of system deployment.

Non-limiting exemplary embodiments highlighting numerous further advantageous aspects include:

A1. A processor-implemented API call abstraction method embodiment, comprising:
  obtaining programming code for an application;
  parsing the obtained programming code to identify instructions in the programming code;
  identifying an application programming interface call in the programming code based on parsing the obtained programming code, the application programming interface call including an input string;
  determining that the identified application programming interface call requires a pre-registered bundle to replace the input string; and
  querying a database for the pre-registered bundle using the input string.

A2. The method of embodiment A1, further comprising:
  obtaining an indication that the pre-registered bundle is not available;
  providing a request to register a new bundle including the input string, upon obtaining the indication that the pre-registered bundle is not available; and
  obtaining an indication that the new bundle has been registered.

A3. The method of embodiment A2, further comprising:
  obtaining a bundle identification corresponding to the new bundle, upon obtaining the indication that the bundle has been registered; and
  replacing the input string in the application programming interface call with the bundle identification.

A4. The method of embodiment A1, wherein parsing the programming code, identifying the application programming interface call, determining that the identified application programming interface call requires the pre-registered bundle, and querying the database for the pre-registered bundle are performed as the programming code is being obtained.

A5. The method of embodiment A1, wherein the application is a multi-user application accessible via a social networking service.

A6. The method of embodiment A3, further comprising:
  compiling the programming code upon replacing the input string in the application programming interface call with the bundle identification;
  obtaining the application based on compiling the programming code; and
  providing the compiled application for a user.

A7. The method of embodiment A3, further comprising:
  storing the new bundle and the bundle identification corresponding to the new bundle in the database.

A8. An API call abstraction system embodiment, comprising:
  a processor; and
  a memory disposed in communication with the processor and storing processor-executable instructions, the instructions comprising instructions to:
    obtain programming code for an application;
    parse the obtained programming code to identify instructions in the programming code;
    identify an application programming interface call in the programming code based on parsing the obtained programming code, the application programming interface call including an input string;

determine that the identified application programming interface call requires a pre-registered bundle to replace the input string; and
query a database for the pre-registered bundle using the input string.

A9. The system of embodiment A8, the instructions further comprising instructions to:
obtain an indication that the pre-registered bundle is not available;
provide a request to register a new bundle including the input string, upon obtaining the indication that the pre-registered bundle is not available; and
obtain an indication that the new bundle has been registered.

A10. The system of embodiment A9, the instructions further comprising instructions to:
obtain a bundle identification corresponding to the new bundle, upon obtaining the indication that the bundle has been registered; and
replace the input string in the application programming interface call with the bundle identification.

A11. The system of embodiment A8, wherein parsing the programming code, identifying the application programming interface call, determining that the identified application programming interface call requires the pre-registered bundle, and querying the database for the pre-registered bundle are performed as the programming code is being obtained.

A12. The system of embodiment A8, wherein the application is a multi-user application accessible via a social networking service.

A13. The system of embodiment A10, the instructions further comprising instructions to:
compile the programming code upon replacing the input string in the application programming interface call with the bundle identification;
obtain the application based on compiling the programming code; and
provide the compiled application for a user.

A14. The system of embodiment A10, the instructions further comprising instructions to:
store the new bundle and the bundle identification corresponding to the new bundle in the database.

A15. A processor-readable medium embodiment storing processor-executable API call abstraction instructions, the instructions comprising instructions to:
obtain programming code for an application; parse the obtained programming code to identify instructions in the programming code;
identify an application programming interface call in the programming code based on parsing the obtained programming code, the application programming interface call including an input string;
determine that the identified application programming interface call requires a pre-registered bundle to replace the input string; and
query a database for the pre-registered bundle using the input string.

A16. The medium of embodiment A15, the instructions further comprising instructions to:
obtain an indication that the pre-registered bundle is not available;
provide a request to register a new bundle including the input string, upon obtaining the indication that the pre-registered bundle is not available; and
obtain an indication that the new bundle has been registered.

A17. The medium of embodiment A16, the instructions further comprising instructions to:
obtain a bundle identification corresponding to the new bundle, upon obtaining the indication that the bundle has been registered; and
replace the input string in the application programming interface call with the bundle identification.

A18. The medium of embodiment A15, wherein parsing the programming code, identifying the application programming interface call, determining that the identified application programming interface call requires the pre-registered bundle, and querying the database for the pre-registered bundle are performed as the programming code is being obtained.

A19. The medium of embodiment A15, wherein the application is a multi-user social networking application.

A20. The medium of embodiment A17, the instructions further comprising instructions to:
compile the programming code upon replacing the input string in the application programming interface call with the bundle identification;
obtain the application based on compiling the programming code; and
provide the compiled application for a user.

A21. The medium of embodiment A17, the instructions further comprising instructions to:
store the new bundle and the bundle identification corresponding to the new bundle in the database.

B1. A processor-implemented application updating method embodiment, comprising:
obtaining an indication to check whether to generate an updated version of an application;
obtaining a module dependency graph for a current version of the application;
identifying current module version numbers for one or more modules in the module dependency graph for the current version of the application;
obtaining, for the modules in the module dependency graph, module version numbers for updated module versions stored in a code database;
obtaining compatibility specifications for the current version of the application and the updated module versions stored in the code database;
analyzing the compatibility specifications for the current version of the application and the updated module versions; and
determining that the updated version of the application can be generated using the updated module versions stored in the code database, based on analyzing the compatibility specifications for the current version of the application and the updated module versions.

B2. The method of embodiment B1, further comprising:
obtaining an updated module version for one of the modules in the module dependency graph of the current version of the application; and
generating the updated version of the application using the obtained updated module version.

B3. The method of embodiment B1, wherein identifying the current module version numbers for the one or more modules in the module dependency graph for the current version of the application includes:
obtaining the current version of the application;
parsing the obtained current version of the application; and
determining the module dependency graph of the current version of the application based on parsing the current version of the application.

B4. The method of embodiment B1, wherein the application is a multi-user application accessible via a social networking service.

B5. The method of embodiment B1, wherein the compatibility specifications include information on at least one of: hardware requirements; operating system requirements; and web browser requirements.

B6. The method of embodiment B2, further comprising:
providing a notification for a user of the generated updated version of the application;
obtaining an indication to provide the updated version of the application for the user; and
providing the updated version of the application for the user.

B7. The method of embodiment B6, further comprising:
obtaining an indication that the updated version of the application replaced the current version of the application on a user device as the user was using the application on the user device.

B8. An application updating system embodiment, comprising:
a processor; and
a memory disposed in communication with the processor and storing processor-executable instructions, the instructions comprising instructions to:
obtain an indication to check whether to generate an updated version of an application;
obtain a module dependency graph for a current version of the application;
identify current module version numbers for one or more modules in the module dependency graph for the current version of the application;
obtain, for the modules in the module dependency graph, module version numbers for updated module versions stored in a code database;
obtain compatibility specifications for the current version of the application and the updated module versions stored in the code database;
analyze the compatibility specifications for the current version of the application and the updated module versions; and
determine that the updated version of the application can be generated using the updated module versions stored in the code database, based on analyzing the compatibility specifications for the current version of the application and the updated module versions.

B9. The system of embodiment B8, the instructions further comprising instructions to:
obtain an updated module version for one of the modules in the module dependency graph of the current version of the application; and
generate the updated version of the application using the obtained updated module version.

B10. The system of embodiment B8, wherein the instructions to identify the current module version numbers for the one or more modules in the module dependency graph for the current version of the application include instructions to:
obtain the current version of the application;
parse the obtained current version of the application; and
determine the module dependency graph of the current version of the application based on parsing the current version of the application.

B11. The system of embodiment B8, wherein the application is a multi-user application accessible via a social networking service.

B12. The system of embodiment B8, wherein the compatibility specifications include information on at least one of: hardware requirements; operating system requirements; and web browser requirements.

B13. The system of embodiment B9, the instructions further comprising instructions to:
provide a notification for a user of the generated updated version of the application;
obtain an indication to provide the updated version of the application for the user; and
provide the updated version of the application for the user.

B14. The system of embodiment B13, the instructions further comprising instructions to:
obtain an indication that the updated version of the application replaced the current version of the application on a user device as the user was using the application on the user device.

B15. A processor-readable medium embodiment storing processor-executable application updating instructions, the instructions comprising instructions to:
obtain an indication to check whether to generate an updated version of an application;
obtain a module dependency graph for a current version of the application;
identify current module version numbers for one or more modules in the module dependency graph for the current version of the application;
obtain, for the modules in the module dependency graph, module version numbers for updated module versions stored in a code database;
obtain compatibility specifications for the current version of the application and the updated module versions stored in the code database;
analyze the compatibility specifications for the current version of the application and the updated module versions; and
determine that the updated version of the application can be generated using the updated module versions stored in the code database, based on analyzing the compatibility specifications for the current version of the application and the updated module versions.

B16. The system of embodiment B15, the instructions further comprising instructions to:
obtain an updated module version for one of the modules in the module dependency graph of the current version of the application; and
generate the updated version of the application using the obtained updated module version.

B17. The medium of embodiment B15, wherein the instructions to identify the current module version numbers for the one or more modules in the module dependency graph for the current version of the application include instructions to:
obtain the current version of the application;
parse the obtained current version of the application; and
determine the module dependency graph of the current version of the application based on parsing the current version of the application.

B18. The medium of embodiment B15, wherein the application is a multi-user application accessible via a social networking service.

B19. The medium of embodiment B15, wherein the compatibility specifications include information on at least one of: hardware requirements; operating system requirements; and web browser requirements.

B20. The medium of embodiment B16, the instructions further comprising instructions to:
provide a notification for a user of the generated updated version of the application;

obtain an indication to provide the updated version of the application for the user; and provide the updated version of the application for the user.

B21. The medium of embodiment B20, the instructions further comprising instructions to:

obtain an indication that the updated version of the application replaced the current version of the application on a user device as the user was using the application on the user device.

In order to address various issues and improve over the prior art, the invention is directed to APPARATUSES, METHODS AND SYSTEMS FOR A SOCIAL NETWORKING APPLICATION UPDATER. The entirety of this application (including the Cover Page, Title, Headings, Field, Background, Summary, Brief Description of the Drawings, Detailed Description, Claims, Abstract, Figures, Appendices and/or otherwise) shows by way of illustration various embodiments in which the claimed inventions may be practiced. The advantages and features of the application are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further un-described alternate embodiments may be available for a portion is not to be considered a disclaimer of those alternate embodiments. It will be appreciated that many of those un-described embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims. It is to be understood that, depending on the particular needs of the SNAM and/or characteristics of the hardware, software, network framework, monetization model and/or the like, various embodiments of the SNAM may be implemented that enable a great deal of flexibility and customization. It is to be understood that, depending on the particular needs of the SNAM and/or characteristics of the hardware, software, network framework, monetization model and/or the like, various embodiments of the SNAM may be implemented that enable a great deal of flexibility and customization. The instant disclosure discusses example implementations of the SNAM within the context of multi-user gaming applications. However, it is to be understood that the system described herein can be readily configured for a wide range of other applications and/or implementations. For example, implementations of the SNAM can be configured to operate within the context of blogging, micro-blogging, professional networking, and/or the like. Alternate implementations of the system may be utilized in various contexts outside social networking, including, but not limited to, office productivity/collaboration software, distributed online advertising, networked surveillance systems, sensor networks, and/or the like. It is to be understood that the SNAM may be further adapted to other implementations and/or software management.

What is claimed is:

1. A method for application programming interface (API) call abstraction, comprising:

obtaining programming code for an application;

parsing the obtained programming code to identify instructions in the programming code;

identifying an API call in the programming code based on parsing the obtained programming code, the API call including an input string;

verifying the input string is one of a plurality of pre-registered input strings maintained in a string registry server that interfaces with a processor of a hosting server;

querying a database to obtain details of a pre-registered bundle using the input string, the details of the pre-registered bundle used to update the programming code for the application by replacing the input string with an identifier of the pre-registered bundle;

compiling the updated programming code for the application to generate a new compiled application;

providing the new compiled application for a user, the providing of the new compiled application includes switching the user from a prior application version to the new compiled application dynamically, in substantial real-time in response to detecting the new compiled application, while the user is continuously utilizing the application, wherein the switching includes, generating an instance of the new compiled application;

issuing a new access request for the instance of the new compiled application on behalf of the user;

dynamically establishing access for the user to the new compiled application; and deleting instance of the prior application version to prevent access of the prior application version;

wherein the method operations are performed by a processor of a developer system.

2. The method of claim 1, wherein switching the application further comprising:

storing a state of the user from the prior application version prior to the switching; and loading the stored state of the user into the new compiled application.

3. The method of claim 1, further comprising:

obtaining an indication that the pre-registered bundle is not available;

providing a request to register a new bundle, upon obtaining the indication that the pre-registered bundle is not available, the request including the input string; and obtaining and indication that the new bundle has been registered.

4. The method of claim 3, further comprising:

obtaining a bundle identification corresponding to the new bundle, upon obtaining the indication that the new bundle has been registered; and replacing the input string in the API call with the bundle identification of the new bundle.

5. The method of claim 4, further comprising:

storing the new bundle and the details of the new bundle including bundle identification corresponding to the new bundle in the database.

6. The method of claim 1, wherein parsing the programming code, identifying the API call, determining that the identified API call requires the pre-registered bundle, and querying the database for the pre-registered bundle are performed as the programming code is being obtained.

7. The method of claim 1, wherein the application is a multi-user application accessible via a social networking service.

8. The method of claim 2, wherein details of the pre-registered bundle include bundle identification of the pre-registered bundle and wherein updating the programming code includes replacing the input string in the API call with the bundle identification of the pre-registered bundle, the updated programming code with the bundle identification used to generate the new compiled application.

9. A system for application programming interface (API) call abstraction, comprising:

a processor; and a memory disposed in communication with the processor and storing processor-executable instructions, the processor executable instructions including instructions to:

obtain programming code for an application;

parse the obtained programming code to identify instructions in the programming code;

identify an API call in the programming code based on parsing the obtained programming code, the API call including an input string;

verify the input string is one of a plurality of pre-registered input strings maintained in a string registry server that interfaces with the processor;

query a database to obtain details of a pre-registered bundle using the input string, the details of the pre-registered bundle used to update the programming code for the application by replacing the input string with an identifier of the pre-registered bundle;

compile the updated programming code for the application to generate a new compiled application; and provide the new compiled application for a user, wherein the instructions to provide includes instructions to switch the user from a prior application version to the new compiled application dynamically, in substantial real-time in response to detecting the new compiled application, while the user is continuously utilizing the application, wherein the instructions to switch includes instructions to, generates an instance of the new compiled application;

issue a new access request for the instance of the new compiled application on behalf of the user;

dynamically establish access for the user to the new compiled application; and delete instance of the prior application version to prevent access of the prior application version.

10. The system of claim 9, the instructions for switching the application further comprising instructions to:

store a state of the user from the prior application version to the switch; and load the stored state of the user into the new compiled application.

11. The system of claim 9, the instructions further comprising instructions to:

obtain an indication that the pre-registered bundle is not available;

provide a request to register a new bundle, upon obtaining the indication that the pre-registered bundle is not available, the request including the input string; and obtain an indication that the new bundle has been registered.

12. The system of claim 11, the instructions further comprising instructions to:

obtain a bundle identification corresponding to the new bundle, upon obtaining the indication that the bundle has been registered;

replace the input string in the API call with the bundle identification; and store the new bundle and the bundle identification corresponding to the new bundle in the database.

13. The system of claim 12, wherein the details of the pre-registered bundle include bundle identification of the pre-registered bundle and wherein the instructions to update the programming code further includes instructions to replace the input string in the API call with the bundle identification of the pre-registered bundle, the updated programming code with the bundle identification used to generate the new compiled application.

14. The system of claim 9, wherein parsing the programming code, identifying the API call, determining that the identified API call requires the pre-registered bundle, and querying the database for the pre-registered bundle are performed as the programming code is being obtained.

15. The system of claim 9, wherein the application is a multi-user application accessible via a social networking service.

16. A non-transitory processor-readable medium storing processor-executable application programming interface (API) call abstraction instructions, the instructions comprising instructions to:

obtain programming code for an application;

parse the obtained programming code to identify instructions in the programming code;

identify an API call in the programming code based on parsing the obtained programming code, the API call including an input string;

verify the input string is one of a plurality of pre-registered input strings maintained in a string registry server that interfaces with a processor;

query a database to obtain details of the pre-registered bundle using the input string, the details of the pre-registered bundle used to update the programming code for the application by replacing the input string with an identifier of the pre-registered bundle;

compile the updated programming code for the application to generate a new compiled application;

provide the new compiled application for a user, wherein the instructions to provide the new compiled application includes instructions to switch the user from a prior application version to the new compiled application dynamically, in substantial real-time, while the user is continuously utilizing the application, wherein the instructions to switch includes instructions to.
generate an instance of the new compiled application;
issue a new access request for the instance of the new compiled application on behalf of the user;
dynamically establish access for the user to the new compiled application; and
delete instance of the prior application version to prevent access of the prior application version.

17. The processor-readable medium of claim 16, wherein the instructions to switch further comprising instructions to:
store a state of the user from the prior application version to the switch; and
load the stored state of the user into the new compiled application.

18. The processor-readable medium of claim 16, the instructions further comprising instructions to:
obtain an indication that the pre-registered bundle is not available;
provide a request to register a new bundle, upon obtaining the indication that the pre-registered bundle is not available, the request including the input string; and
obtain an indication that the new bundle has been registered.

19. The processor-readable medium of claim 18, the instructions further comprising instructions to:
obtain a bundle identification corresponding to the new bundle, upon obtaining the indication that the bundle has been registered;
replace the input string in the API call with the bundle identification of the new bundle; and
store the new bundle and the bundle identification corresponding to the new bundle in the database.

20. The processor-readable medium of claim 16, wherein parsing the programming code, identifying the application programming interface call, determining that the identified application programming interface call requires the pre-registered bundle, and querying the database for the pre-registered bundle are performed as the programming code is being obtained and wherein the application is a multi-user social networking application.

* * * * *